US012571480B2

(12) United States Patent
Stathis

(10) Patent No.: US 12,571,480 B2
(45) Date of Patent: Mar. 10, 2026

(54) PIPE BURST PREVENTION RELIEF VALVE, CONTROL VALVE SYSTEM AND METHOD

(71) Applicant: James H. Stathis, Cambridge, MA (US)

(72) Inventor: James H. Stathis, Cambridge, MA (US)

( * ) Notice: Subject to any disclaimer, the term of this patent is extended or adjusted under 35 U.S.C. 154(b) by 74 days.

(21) Appl. No.: 18/596,516

(22) Filed: Mar. 5, 2024

(65) Prior Publication Data

US 2025/0283547 A1 Sep. 11, 2025

(51) Int. Cl.
| | |
|---|---|
| *F16K 17/40* | (2006.01) |
| *E03B 7/10* | (2006.01) |
| *F15D 1/02* | (2006.01) |
| *E03C 1/02* | (2006.01) |

(52) U.S. Cl.
CPC .............. *F16K 17/403* (2013.01); *E03B 7/10* (2013.01); *F15D 1/025* (2013.01); *E03C 2001/026* (2013.01); *F16K 2200/501* (2021.08)

(58) Field of Classification Search
CPC .... F16K 17/403; F16K 2200/501; E03B 7/10; F15D 1/025; E03C 2001/026
See application file for complete search history.

(56) References Cited

U.S. PATENT DOCUMENTS

| | | | |
|---|---|---|---|
| 3,424,189 A | 1/1969 | Woodford |
| 3,810,602 A | 5/1974 | Parkinson |
| 4,234,009 A | 11/1980 | Fuchs |
| 4,651,770 A | 3/1987 | Denham et al. |
| 5,014,731 A | * 5/1991 | Westerberg | ............... E03B 7/12 |
| | | | 137/59 |
| 5,632,303 A | 5/1997 | Almasy et al. |
| 5,730,168 A | * 3/1998 | Gordon | ..................... E03B 7/10 |
| | | | 137/59 |
| 6,186,159 B1 | 2/2001 | Degood, III et al. |
| 6,196,246 B1 | 3/2001 | Folsom |
| 6,263,919 B1 | 7/2001 | Knapp |

(Continued)

FOREIGN PATENT DOCUMENTS

| | | |
|---|---|---|
| AU | 2021107410 | 8/2021 |
| CA | 2488953 | 6/2005 |

(Continued)

OTHER PUBLICATIONS

IDS filed in U.S. Appl. No. 18/596,519 on Jul. 19, 2025.

(Continued)

*Primary Examiner* — P. Macade Nichols

(74) *Attorney, Agent, or Firm* — Betty A. Ryberg; Betty A. Riberg, LLC

(57) ABSTRACT

A pressure relief valve that is spring-activated or utilizes a burst disk is described for preventing pipe bursts in a building plumbing system. A control valve system and method for preventing pipe bursts utilizing the pressure relief valve are also described. Also described are spring-activated control valve cartridges and control valve systems utilizing spring-activated control valve cartridges that prevent pipe bursts when installed building plumbing systems. Further described are methods for preventing pipe bursts in building plumbing systems comprising the step of disposing a relief valve or spring-activated cartridge according to the disclosure in a building plumbing system.

20 Claims, 14 Drawing Sheets

(56) References Cited

U.S. PATENT DOCUMENTS

| | | | |
|---|---|---|---|
| 6,394,132 | B1 | 5/2002 | Walcome |
| 7,108,011 | B1 | 9/2006 | Lordahl et al. |
| 7,475,703 | B2 | 1/2009 | Kempf et al. |
| 7,644,730 | B2 | 1/2010 | Reck |
| 8,522,814 | B2 | 9/2013 | Kempf et al. |
| 8,944,086 | B2 | 2/2015 | Park |
| 10,260,642 | B2 | 4/2019 | Pitsch et al. |
| 11,649,905 | B2 | 5/2023 | Jones et al. |
| 2003/0041898 | A1 | 3/2003 | Dulin |

FOREIGN PATENT DOCUMENTS

| | | |
|---|---|---|
| JP | 2000074236 A | 3/2000 |
| KR | 20130100251 A | 9/2013 |
| KR | 102093044 B1 | 3/2020 |
| WO | WO2012148888 | 11/2012 |
| WO | WO2018/089537 A1 | 5/2018 |

OTHER PUBLICATIONS

IDS filed in U.S. Appl. No. 18/596,516 on Jul. 19, 2025.
https://en.wikipedia.org/wiki/Relief_valve.
https://www.amazon.com/Ceramic-Cartridge-Replacement-Quarter-Bathroom/dp/B07NVFPXNF/.
https://shop.parlos.com/products/parlos-ceramic-stem-disc-faucet-cartridge-replacement-for-bathroom-tap-1-pair-hot-cold.
International Search Report in PCT/US2025/017233, entitled Pipe Burst Prevention Cartridge with Washer, Valve System and Method, dated May 1, 2025.
Written Opinion in PCT/US2025/017233, entitled Pipe Burst Prevention Cartridge with Washer, Valve System and Method, dated May 1, 2025.
International Search Report in PCT/US2025/017215, entitled Pipe Burst Prevention Relief Valve, Control Valve System and Method, dated May 27, 2025.
Written Opinion in PCT/US2025/017215, entitled Pipe Burst Prevention Relief Valve, Control Valve System and Method, dated May 27, 2025.
Response to Office Action filed in U.S. Appl. No. 18/596,516 on Jul. 19, 2025.
Office Action in U.S. Appl. No. 18/596,516, dated May 5, 2025.
IDS filed in U.S. Appl. No. 18/596,509 on Jul. 19, 2025.
International Search Report in PCT/US2025/017227, entitled Pipe Burst Prevention Ceramic Cartridge, Valve System and Method, dated Apr. 3, 2025.
Written Opinion in PCT/US2025/017233, entitled Pipe Burst Prevention Relief Valve, Control Valve System and Method, dated May 27, 2025.
International Search Report in PCT/2025/017233, entitled Pipe Burst Prevention Relief Valve, Control Valve System and Method, dated May 27, 2025.
Written Opinion in PCT/US2025/017215, entitled Pipe Burst Prevention Cartridge with Washer, Valve System and Method, dated May 1, 2025.
International Search Report in PCT/US2025/017215, entitled Pipe Burst Prevention Cartridge with Washer, Valve System and Method, dated May 1, 2025.

Notice of Allowance in U.S. Appl. No. 18/596,519, mailed May 14, 2025.
IDS filed in U.S. Appl. No. 18/596,519, on Jun. 8, 2025.
Comments filed in U.S. Appl. No. 18/596,519, on Jun. 8, 2025.
Solar Direct. Vernatherm Freeze Protection Valve 35F Discharge 0.50 Inch, Model KC4500-00, https://shop.solardirect.com/product_info.php?products_id=1014.
Thermomegatech, Valve Takes Advantage of Paraffin Wax To Control Temperature and Flow, Mar. 1, 2018, https://www.tot-ad.com/valve-takes-advantage-of-paraffin-wax-to-control-t.
Aquor Water Systems, Aquor Hydrant, https://www.aquorwatersystems.com/collections/hydrants.
Kohler Co., MasterShower, 3/4" Two- or Three-Way Transfer Valve, K-728-K Installation Instructions, www.kohler.com.
Moen, Chateau Posi-Temp Single-Handle Tub/Shower Valve Only. Installation Guide, May 2014, www.moen.com.
Lyons, Foster, Understanding How Water Pipes Freeze, Journal of Light Construction, Feb. 3, 2022.
Woodford Manufacturing Company, Model 17 Freezeless Wall Faucet. Troubleshooting & Maintenance, Rev May 2011, Colorado Springs, Colorado.
Woodford Manufacturing Company, Freezeless Anti-Siphon Wall Faucet Model 17, Rev Apr. 2021, Colorado Springs, Colorado.
Woodford Manufacturing Company, Freezeless Wall Faucets Models 14 & 17 Installation Instructions, Rev May 2010, Colorado Springs, Colorado.
Woodford Manufacturing Company, How a Standard Frost-Proof Faucet Works, Tech-Note, Rev Apr. 2015, Colorado Springs, Colorado.
Woodford Manufacturing Company, Freezeless Iowa Yard Hydrant Model Y34 & Y1 Specifications & Parts List. Rev Nov. 2010, Colorado Springs, Colorado.
Woodford Manufacturing Company, Y34 & Y1 Yard Hydrant Troubleshooting & Maintenance, Rev Jun. 2015, Colorado Springs, Colorado.
Woodford Manufacturing Company, How a Freeze-Proof Yard Hydrant Works Tech-Note, Rev Sep. 2015, Colorado Springs, Colorado.
Woodford Manufacturing Company, Y34 & Y1, W34, X34 and R34 Installation Instructions, Rev May 2010, Colorado Springs, Colorado.
Kim, Maddy, The Ubiquitous Question: What is the Difference Between Ceramic and Washerless Cartridges? Jul. 25, 2018, Kingston Kitchen & Bath.
Sigma Faucet Parts Faucet Cartridge Fundamentals, https://sigmafaucetparts.com/pages/faucet-cartridge-fundamentals.
Rostra Vematherm, LLC, Freeze Protection Valve, https://www.vernet-group.com/wp-content/uploads/2019/12/Freeze-Solar-valve.pdf.
Moen, Chateau Posi-Temp Single-Handle Tub/Shower Valve Only, Illustrated Parts, Mar. 2014, www.moen.com.
Kohler Co., MasterShower, 3/4" Two- or Three-Way Transfer Valve, K-728-K Specification Sheet, Sep. 27, 2020, www.kohler.com.
Written Opinion in PCT/US2025/017227, entitled Pipe Burst Prevention Ceramic Cartridge, Valve System and Method, dated Apr. 3, 2025.

\* cited by examiner

FIG. 12A FIG. 12B

PIPE BURST PREVENTION RELIEF VALVE, CONTROL VALVE SYSTEM AND METHOD

BACKGROUND

During cold snaps, water in pipes and valves in a building can freeze. When water in pipes and valves freezes, the pipes and valves can burst, damaging the plumbing, electrical and HVAC systems in the building and the area in the vicinity of the burst. Damage associated with pipe bursts can require that the water and other utilities to and systems in the building be turned off, and building occupants evacuate the building and the building remain unoccupied until it has been repaired.

Repairs associated with a burst pipe or valve can require the replacement of the pipe, valve, and wall in which the pipe or valve was installed, insulation, electrical and HVAC systems, fixtures and finishes in the surrounding building area, and furniture and other possessions in the building. Repairing the building and replacing damaged fixtures, furniture and possessions can cost a considerable amount of money. In addition, the inability to use the pipe or valve, and surrounding area can cause downtime, inconvenience and possibly additional costs associated with loss of use of the building, including rental income, and moving into and renting a temporary space until the repairs are completed.

It has been reported that burst pipes due to freezing cause over USD $100 million in the United States and approximately USD $1 billion worldwide in damages each year. The Red Cross has reported that more than 250,000 families across the United States experience frozen or burst pipes each year. In addition, losses due to burst pipes and valves are on the rise because of increases in the height of apartment buildings, the number of bathrooms per bedroom in dwellings, the number of water-using appliances in buildings, and the amount of water used per person. Losses due to burst pipes and valves are also rising because of the vulnerability of buildings to damage due to modern methods of building construction, such as tiny homes, modular buildings, bathrooms and kitchens, and mass timber or exposed beam construction.

Bursting pipes and valves in a building due to the freezing of water in them is a problem that persists to this day, despite efforts by others to solve the problem. What is needed, therefore, is a relief valve that can be installed in an existing building plumbing system which will protect it from bursting when pipes or valves in the system freeze. What is also needed is a compact water delivery control valve system for use as a plumbing fixture in a building plumbing system that does not burst and protects the pipes and other fixtures connected to it from bursting under freezing conditions. What is further needed is a method for preventing pipes or valves in a building plumbing system from freezing by disposing the relief valve or valve system having the relief valve in the building plumbing system.

SUMMARY

Accordingly, in one aspect, a relief valve for pipes or valves or other fixtures in a building plumbing system is described that includes a body having an inlet, an outlet, an exterior surface, and an interior surface that defines a generally longitudinal passageway that extends from the inlet to the outlet, a valve seat disposed on the interior surface of said body between the inlet and the outlet, a flow limiter disposed on the interior surface of said body between said valve seat and the outlet, and extending into the passageway, and a valve seat sealing portion disposed in fluid communication with said valve seat between the inlet and said flow limiter, and configured to seal said valve seat against the flow of fluid in the passageway when the fluid has a pressure that is less than a predetermined pressure. In another aspect, a compact, pipe-burst-prevention valve system for use in a building plumbing system is described that includes a faucet housing having a handle and an outlet for delivering fluid to an end user, a control valve having an inlet and an outlet in fluid communication with each other and the control valve outlet in fluid communication with the faucet outlet, and the relief valve. Further described is a method for preventing pipes from bursting that includes disposing the pressure relief valve or valve system having the pressure relief valve in fluid communication with a building plumbing system.

Accordingly, in another aspect, a pipe-burst-prevention fluid control valve cartridge for fluid having a pressure is described that includes a body having a stem end, a valve end capable of being held in fluid communication with a fluid control valve of a faucet in a plumbing system, an exterior surface, and a generally cylindrical interior surface, a generally cylindrical split stem, at least a portion which is configured to be rotatably held within the interior of said cartridge body, having a spindle configured to receive a faucet handle, an upper stem sized so as to be received within the interior surface of said cartridge body and configured to be capable of being rotated when the spindle is turned, and an upper end adjacent to the spindle and a lower end generally opposite the upper end and adjacent to the cartridge body valve end with a cavity extending therefrom into the upper stem toward the upper stem upper end, the upper stem configured to extend toward the valve end of the cartridge body when the spindle is rotated to close the valve and retract from the valve end when the spindle is rotated to open the valve, a lower stem having an upper end configured so that a portion of it can be slidably received into the interior of said cartridge body at its valve end and adjacent to the lower end of the upper stem with a piston affixed thereto, and a spring held in the cavity by the piston that is capable of compressing when the pressure of the fluid in the valve equals or exceeds a predetermined pressure, wherein the piston, cavity and spring have diameters such that the cavity can receive slidably the spring and the piston and lengths such that the lower end of the upper stem and the upper end of the lower stem form a gap when the spring is fully extended. In another aspect, a compact, pipe-burst-prevention control valve system for use with fluid having a pressure in a building plumbing system is described that includes a faucet housing having a handle and an outlet for delivering fluid from the building plumbing system, a control valve having an inlet and an outlet in fluid communication with each other and the control valve outlet in fluid communication with the faucet housing outlet, and the split stem cartridge disposed in fluid communication with said control valve within said faucet housing in between the faucet inlet and the faucet outlet. Further described is a method of preventing pipes in a building plumbing system from bursting, comprising the step of disposing a fluid control valve system for use with a fluid having a pressure in fluid communication with the building plumbing system that includes a faucet housing having a handle and an outlet for delivering fluid from the building plumbing system, a control valve having an inlet and an outlet in fluid communication with each other and the control valve outlet in fluid communication with the faucet housing outlet, and the split stem cartridge disposed in fluid communication with said control valve within said faucet housing in between the faucet inlet and the faucet outlet.

In yet another aspect, a pipe-burst-prevention fluid control valve cartridge for fluid having a pressure is described that includes a body having a stem end, a valve end capable of being held in fluid communication with a fluid control valve of a faucet in a plumbing system, an exterior surface, and a generally cylindrical interior surface, a generally cylindrical split stem, at least a portion of which is configured to be rotatably held within the interior of said body, having a spindle configured to receive a faucet handle that includes an upper stem sized so as to be received within the interior surface of said body and configured to be capable of being rotated when the spindle is turned, and having an upper end adjacent to the spindle and a lower end generally opposite the upper end and adjacent to the cartridge body valve end with the upper end toward the cartridge body valve end with an interior cavity extending therefrom into the upper stem toward the upper stem upper end, a lower stem having an upper end adjacent to the lower end of the upper stem with a piston affixed on the lower stem upper end and a lower end generally opposite the lower stem upper end, the lower stem configured to be slidably received into and rotatably held in the interior of said cartridge body to allow it to rotate when the spindle is rotated and prevent the flow of fluid from the inlet to the outlet when the spindle is rotated to its closed position and the pressure of the fluid is less than the predetermined pressure, and allow the flow of fluid through the outlet when the spindle is rotated to its open position or the spindle is in its closed position and the pressure of the fluid equals or exceeds the predetermined pressure, and a spring held in the cavity by the piston that is capable of compressing when the pressure of the fluid in the valve equals or exceeds the pre-determined pressure, wherein the piston, cavity and spring have diameters such that the cavity can receive slidably the spring and the piston, and lengths such that the lower end of the upper stem and the upper end of the lower stem form a gap when the spring is fully extended, and a cartridge base held in said cartridge body at its valve end having an opening adjacent to the lower end of the lower stem. In another aspect, a compact, pipe-burst-prevention control valve system for use with fluid having a pressure in a building plumbing system is described that includes a faucet housing having a handle and an outlet for delivering fluid from the building plumbing system, a control valve having an inlet and an outlet in fluid communication with each other and the control valve outlet in fluid communication with the faucet housing outlet, and the cartridge disposed in fluid communication with said control valve within said faucet housing in between the faucet inlet and the faucet outlet. Further described is a method of preventing pipes in a building plumbing system from bursting, comprising the step of disposing the fluid control valve system having the split stem cartridge for use with a fluid having a pressure in fluid communication with the building plumbing system.

DETAILED DESCRIPTION

Relief Valve

A pressure relief valve is described that is configured so that it can be installed in an existing building plumbing system to allow fluid to flow through the relief valve to protect the pipes, one or more valve control systems used in faucets, or other fixtures installed in the plumbing system from bursting when the fluid in the pipes, valve systems or other fixtures in the system freezes. The relief valve has a generally tubular and longitudinal body having an interior defining a generally longitudinal passageway through which fluid may flow. The body also has an inlet into which fluid from a high-pressure source is received, an outlet through which fluid at a lower pressure exits the relief valve, and an exterior surface that is generally longitudinal. The relief valve also has a valve seat disposed on the interior surface of the body between the inlet and the outlet, a flow limiter disposed on the interior surface of the body between the valve seat and the outlet and extends into the passageway, and a valve seat sealing portion disposed in fluid communication with the valve seat between the inlet and the flow limiter. The valve seat sealing portion is configured to seal against the valve seat so that the flow of fluid through the valve seat and, accordingly, the passageway, is prevented when the fluid has a pressure that is equal to or less than a predetermined pressure, and not seal against the valve seat, thereby allowing fluid to flow through the valve seat and passageway, when the fluid has a pressure that is great than the predetermined pressure.

The valve seat sealing portion can be generally transverse or parallel to the exterior surface of the body. In the embodiment in which the valve sealing portion is generally transverse to the exterior surface of the relief valve body, the valve seat is generally parallel to the exterior surface of the body. In the embodiment in which the valve sealing portion is generally parallel to the exterior surface of relief valve body, the valve seat is generally transverse to body exterior.

Figure 1:
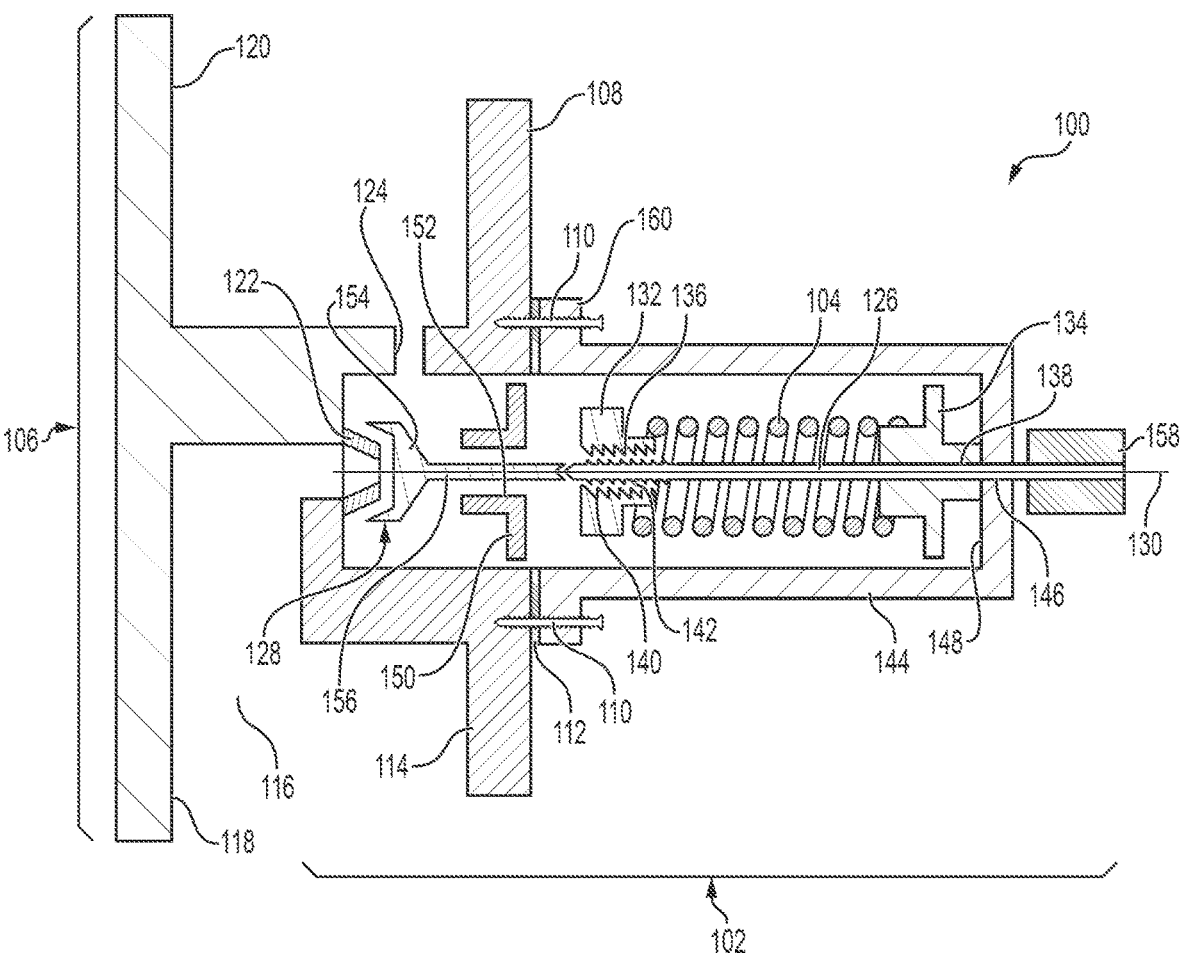
FIG. 1 is a cross-sectional view taken along the longitudinal centerline of one embodiment of a pressure relief valve according to the disclosure.

An embodiment of the pressure relief valve according to the disclosure that has a valve seat sealing portion that is generally transverse to the exterior surface of the body is the spring-activated pressure relief valve embodiment 100 having a valve seat sealing portion 102 that has a spring 104, and a generally tubular longitudinal body 106, shown in FIG. 1. In this embodiment, body 106 has an exterior surface 108 to which valve seat sealing portion 102 is attached generally transverse to body exterior surface 108.

Valve seat sealing portion 102 may be attached using conventional means such as soldering or using screws 110. The valve seat sealing portion 102 also is preferably attached to exterior surface 108 using a seal or gasket 112 to prevent the flow of fluid between valve seat sealing portion 102 and exterior surface 108.

Body 106 has an interior surface 114 that defines a generally longitudinal passageway 116 extending through the interior surface 114 of body 106 through which fluid may flow. The body 106 also has an inlet 118 into which fluid from a high-pressure source in a building plumbing system is received, and an outlet 120 through which fluid flows through passageway 116 out of relief valve 100.

Relief valve 100 also has a valve seat 122 disposed on interior surface 114 of body 106 between inlet 118 and outlet 120 and configured to be capable of allowing fluid to flow from inlet 118 to outlet 120 through passageway 116. Valve seat 122 can be any shape but preferably, for ease of manufacturing, it has a generally cylindrically shaped opening through which fluid may flow. It preferably is constructed integrally with valve body 106. Alternatively, it may be comprised of a layer of a material that is different from the body 106 applied to interior surface 114 and glued or molded in place.

Relief valve 100 further has a flow limiter 124 disposed on interior surface 114 between valve seat 122 and outlet 120 and extending into passageway 116. The flow limiter 124 is sized such that the flow of fluid from inlet 118 to outlet 120 is reduced from a normal flow of fluid in a building plumbing system which is from about 0.5 to about 2.5 gallons per minute ("GPM") at a normal fluid pressure which for a domestic building plumbing system for water is typically about 40 pounds per square inch ("PSI"). Preferably, flow limiter 124 is sized to reduce the flow of fluid from inlet 118 to outlet 120 by about 50% to about 80% of the normal flow, or from about 0.25 to about 1.25 GPM to about 0.10 to about 0.50 GPM. More preferably, flow limiter 124 is sized to limit the flow of fluid through relief valve 100 to less than about 0.4 GPM.

Flow limiter 124 may be comprised of a single circular opening. In this case, it can have a diameter of less than about 0.05 inches or an opening area of about 0.0020 square inches or less. Preferably, flow limiter 124 has a diameter of between about 0.015 inches to about 0.05 inches or an area of between about $1.77 \times 10^{-4}$ to about 0.0020 square inches.

Preferably, flow limiter 124 may be comprised of multiple smaller, circular orifices. A flow limiter 124 comprised of multiple smaller, circular orifices reduces the chance that the flow limiter will become clogged. Where flow limiter 124 is comprised of multiple orifices, the sum of area of the orifices equals approximately that for a flow limiter having a single circular opening.

Valve seat sealing portion 102 has a movable shaft 126 on which a valve seat holder 128 which is disposed at one end closest to and capable of being held against valve seat 122.

Valve seat sealing portion 102 has a longitudinal center 130 which extends through it and spring holders 132 and 134 each with centers 136 and 138, respectively, along centerline 130. Shaft 126 is disposed through spring holder center 138, through spring 104, and spring holder center 136. At least one of spring holders 132 or 134 may have threads 140, shown disposed on the inside center of holder 132, and shaft 126 may have threads 142 such that shaft 126 may be rotated to travel inward or outward, thereby adjusting the force of spring 104 to apply a greater or lesser force on shaft 126 than the force of spring 104 alone would apply to shaft 126 without adjustment, and transferring that force to valve seat holder 128 and valve seat 122 to close relief valve 100 and prevent fluid from flowing through it. FIG. 1 shows the interior center 136 of spring holder 132 and the exterior of shaft 126 as having threads on each 140 and 142, respectively.

Valve seat sealing portion 102 has a bonnet 144 which is attached sealably to exterior surface 108 of relief valve 100 over centerline 130. Bonnet 144 has a center 146 which aligns with centerline 130, and an interior surface 148 opposite valve seat holder 128.

As shown in FIG. 1, bonnet 144 holds spring holder 134 against bonnet interior surface 148 on one end opposite valve seat 122 under the force of spring 104 held at the other end adjacent to valve seat 122 by spring holder 132. Valve seat sealing portion 102 has a collar 150 with a center 152 upon which spring holder 132 rests against the force of spring 104. Where valve seat sealing portion 102 has two spring holders, as shown in FIG. 1, bonnet 144 holds spring holder 134 against bonnet interior surface 148 under the force of spring 104 with spring holder 132 holding spring 104 at its other end against collar 150. Valve seat sealing portion 102 need not have spring holder 134, but rather spring 104 may rest against bonnet interior 148. Alternatively, valve seat sealing portion 102 need not have spring holder 132, in which case spring 104 may rest on collar 150 at one end and spring holder 134 at the other end, and spring holder 134 may have threads on its interior and movable shaft 126 may have threads disposed on its exterior adjacent to the threads on the interior of spring holder 134 thereby allowing the force applied to valve seat holder 128 against valve seat 122 to be adjusted.

Valve seat holder 128 has a flange portion 154 which is disposed adjacent to valve seat 122 and configured to be capable of holding and sealing valve seat 122. Valve seat holder 128 further has a rod portion 156 extending away from flange portion 154 along centerline 130 through collar center 152 and abutting shaft 126.

In the embodiment shown in FIG. 1, shaft 126 extends through spring holder 132, through its center 136, through spring 104 and spring holder 134 through its center 138. Shaft 126 may exit bonnet 144 through its center 146 opposite valve seat holder 128 to allow spring holder 132 or 134 to be adjusted by rotating it. Shaft 126 also may have knob 158 to allow an end user to rotate shaft 126 more easily. Further, knob 158 may have knurls on its exterior, which further facilitate gripping and rotation of knob 158.

Bonnet 144 may be secured sealably to exterior surface of relief valve body 108 using convention means. In FIG. 1, bonnet 144 has a flange 160, and bonnet 144 is secured to exterior surface 108 with seal 112 in between bonnet flange 160 and exterior surface 108 using screws 110. In addition, movable shaft 126 preferably has a seal between it and bonnet 144 at its center 146 where it exits so that fluid cannot flow between shaft 126 and bonnet center 146. Similarly, collar 150 should have a seal between it and bonnet 144 and rod portion 156 so that fluid cannot flow through flow limiter 124 unless pressure relief valve 100 has been activated.

Relief valve 100 may be made using convention plumbing manufacturing methods. Relief valve 100 is used by installing it in a building plumbing system either by soldering it into a plumbing line, or by manufacturing it with threaded inlet 118 and outlet 120 and using threaded couplings to secure it in fluid communication with the building plumbing system.

Relief valve 100 inlet 118 receives fluid from a hot- or cold-water source in a domestic plumbing system. From inlet 118, the fluid can flow through passageway 116 of body 108 and valve seat 122 if the pressure of the fluid is greater than a predetermined pressure. The predetermined pressure is the force required to activate or lift valve seat holder 128 off valve seat 122 to deliver fluid through valve seat 122 to outlet 120 and the delivery end of a faucet, other valve, or other fixture in the building plumbing system.

Flow limiter 124 restricts the flow of fluid through relief valve 100 so that the pressure of the fluid is relieved when the fluid in the line freezes but will flow at less than the rate of flow through an open valve in the building plumbing system. Thus, flow limiter 124 protects the surroundings in case the flow of fluid has the potential to cause damage.

Spring 104 has a compressive force such that when divided by the area of the open area of valve seat 122 which is in contact with seat holder 128 is approximately equal to or less than the predetermined pressure. The activation pressure is the compressive pressure required to activate relief valve 100 and overcome the force required to compress spring 104 so that fluid may flow through relief valve 100. The predetermined pressure can be preset by selecting spring 104 that has a compressive force that will allow it to be compressed at the pressure desired to activate relief valve 100. The predetermined pressure also can be preset by selecting spring 104 to have a desired compressive force such that when one or both spring holders 132 and 134 are present the activation pressure of relief valve 100 can be preset to be higher than the compressive force of the spring 104 alone. In either case, spring 104 has a force such that it is capable of applying the desired pressure on seat holder 128, which in turn applies pressure to the valve seat 122 and closes relief valve 100 when the pressure of the fluid in the building plumbing system is less than or equal to the pressure that will burst one or more pipes, valves or fixtures in the building plumbing system, and activates or opens relief valve 100 when the pressure of the fluid in the building plumbing system is greater than or equal to the pressure that will burst one or more pipes, valves or fixtures in the building plumbing system.

A typical water control valve used in domestic plumbing is estimated to have a break strength of around 4,000 PSI. A pressure that would break a typical copper plumbing pipe is approximately 1,000 PSI, depending on the wall thickness and method used to manufacture the pipe. Plastic (PEX) pipe will typically burst at around 500 PSI. Normal water pressure in a domestic plumbing system is typically less than 100 PSI, and, more typically, around 40 PSI.

Preferably, spring 104 has a compressive pressure that is less than the pressure at which the weakest component in the plumbing system will burst. The compressive pressure required to compress spring 104 is the force required to compress the spring divided by the area of the valve seat opening which is in contact with the seat holder when the relief valve is closed. If relief valve 100 has at least one spring holder 132 or 134 that is adjustable on shaft 126, then spring 104 can have a lower compressive pressure than required to activate relief valve 100 if holder 132 or 134 may be adjusted to increase the pressure required to compress the spring as adjusted desired force.

Spring 104 in relief valve 100 for use in a plumbing system with plastic (PEX) piping preferably has a compressive force such that relief valve 100 will have an activation pressure of less than about 500 PSI. More preferably, spring 104 used in relief valve 100 for a plumbing system with plastic (PEX) piping has a compressive force such that relief valve 100 has an activation pressure of between about 200 and about 395 PSI, and, even more preferably, between about 300 and about 395 PSI.

For a building plumbing system that has no plastic PEX piping but rather only copper piping, spring 104 preferably has a compressive force such that relief valve 100 has an activation pressure of less than about 1,000 PSI. More preferably, spring 104 used in relief valve 100 in a plumbing system with only copper piping has a compressive force such that relief valve 100 has an activation pressure of between about 400 and about 995 PSI, and, even more preferably, between about 500 and about 995 PSI.

Figure 2:
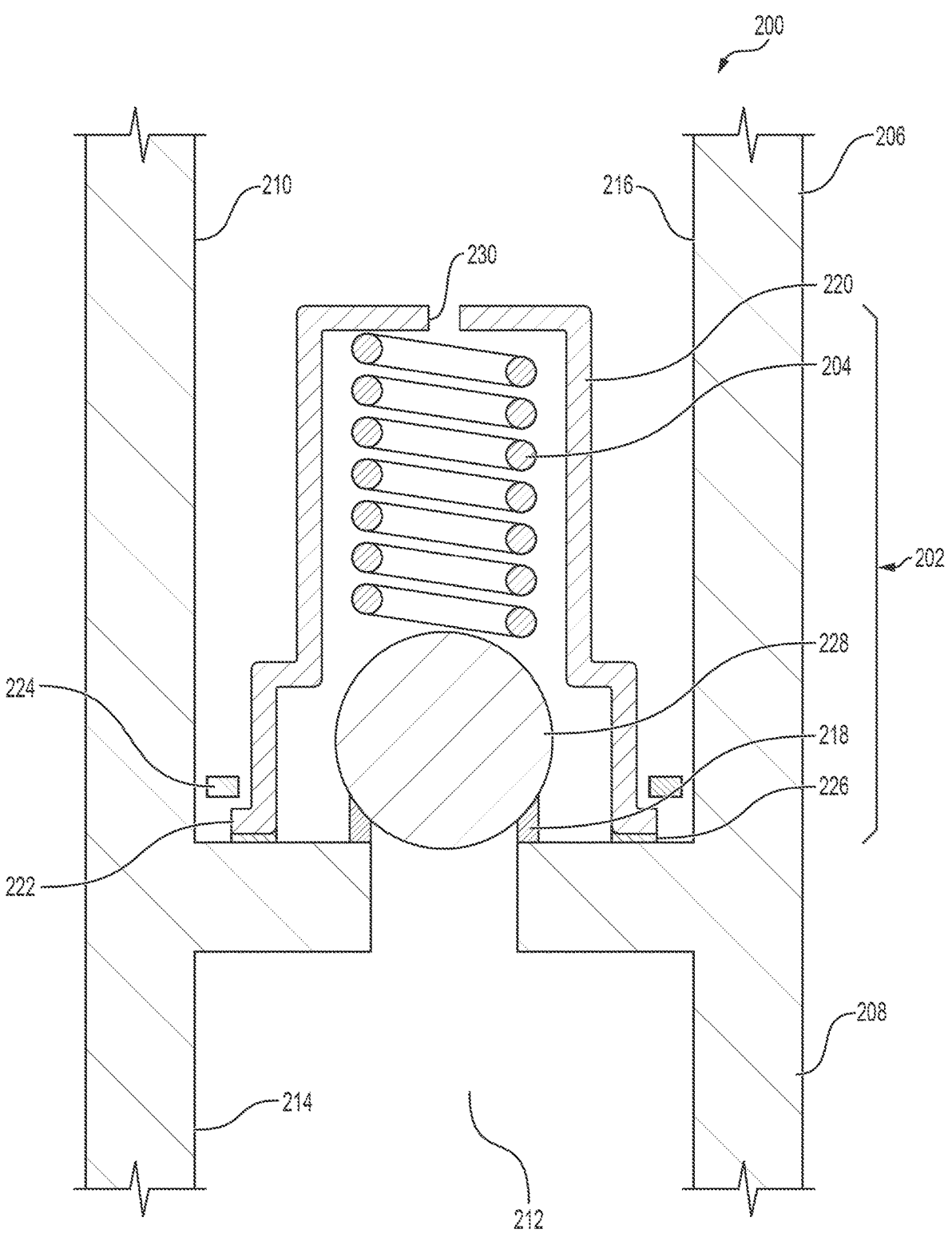
FIG. 2 is a cross-sectional view taken along the longitudinal centerline of an alternative embodiment of a pressure relief valve according to the disclosure.

In another spring-activated embodiment according to the disclosure, the valve seat sealing portion can be disposed within the passageway generally parallel to the exterior surface of the body, and the valve seat disposed in the passageway generally transverse to the interior and exterior surfaces of the relief valve body, as shown in FIG. 2. Relief valve 200 has a valve seat sealing portion 202 with a spring 204, and a generally tubular elongate body 206 with an exterior surface 208 and an interior surface 210 defining a passageway 212 that extends through body 206 through which fluid may flow. Valve seat sealing portion 202 is disposed generally parallel to exterior and interior surfaces 208 and 210 within passageway 212. Relief valve 200 further has an inlet 214 capable of receiving fluid from a source or other plumbing fixture at relatively high pressure, such as that from a domestic plumbing system cold- or hot-water source, and an outlet 216 capable of receiving fluid at a lower pressure from the inlet 214 after the fluid has traveled through passageway 212 and exiting relief valve 200 for delivery to a faucet, other valve or other fixture in a building plumbing system, and a valve seat 218 disposed in between inlet 214 and outlet 216 generally transverse to passageway 212.

Valve seat sealing portion 202 has a bonnet 220 attached over valve seat 218 so that fluid flowing through valve seat 218 passes through bonnet 220. Bonnet 220 may be soldered in place. Or bonnet 220 may have a flange 222 and be attached with a retainer 224 and screws to flange 222. Preferably, bonnet 220 is sealably attached so that fluid cannot flow between bonnet flange 222 and interior surface 210 using a seal 226 therebetween.

Bonnet 220 holds spring 204 against a ball 228, which in turn is forced down against valve seat 218 by spring 204, thereby sealing relief valve 200. Ball 228 is generally round for ease of manufacturing but could have other shapes. Valve seat 218 is generally round for receiving a round ball for ease of manufacturing but could have other shapes so long as ball seats in valve seat to seal it. Valve seat 218 and ball 228 are sized to seal with each other and prevent the flow of fluid through valve 200 when ball 228 is forced against valve seat 218 by spring 204.

Valve seat 218 may be comprised of the same material of which body 206 is comprised. Valve seat 218 could be made of a material that is different from the material used to make body 206, like valve seat 122 of relief valve 100.

Relief valve 200 also has a flow limiter 230 which allows fluid to flow through relief valve 200 once activated but restricts the flow to less than the normal flow of fluid through a building plumbing pipe. Flow limiter 230 is disposed in bonnet 220 distal to bonnet flange 222. Flow limiter 230 may have the features and be sized like flow limiter 124 of relief valve 100.

The force required to allow fluid to flow through relief valve 200, in other words its activation pressure, can be preset by selecting spring 204 with a compressive force that will exert the desired pressure on ball 228 to prevent fluid from flowing through valve seat 218, keeping relief valve 200 closed until the force of the fluid exceeds the compressive force of spring 204. Spring 204 has a compressive force as described relative to spring 104 and relief valve 100 that is less than the force which would burst the weakest component in the building plumbing system.

The activation pressure of relief valve 200 could be increased above the compressive force of spring 204 by including spacers within bonnet 220 or using a bonnet 220 sized to hold spring 204 in a compressed state. Doing so would increase the force that spring 204 would apply to ball 228, which would in turn increase the force that would be required to open relief valve 200.

Figure 3:
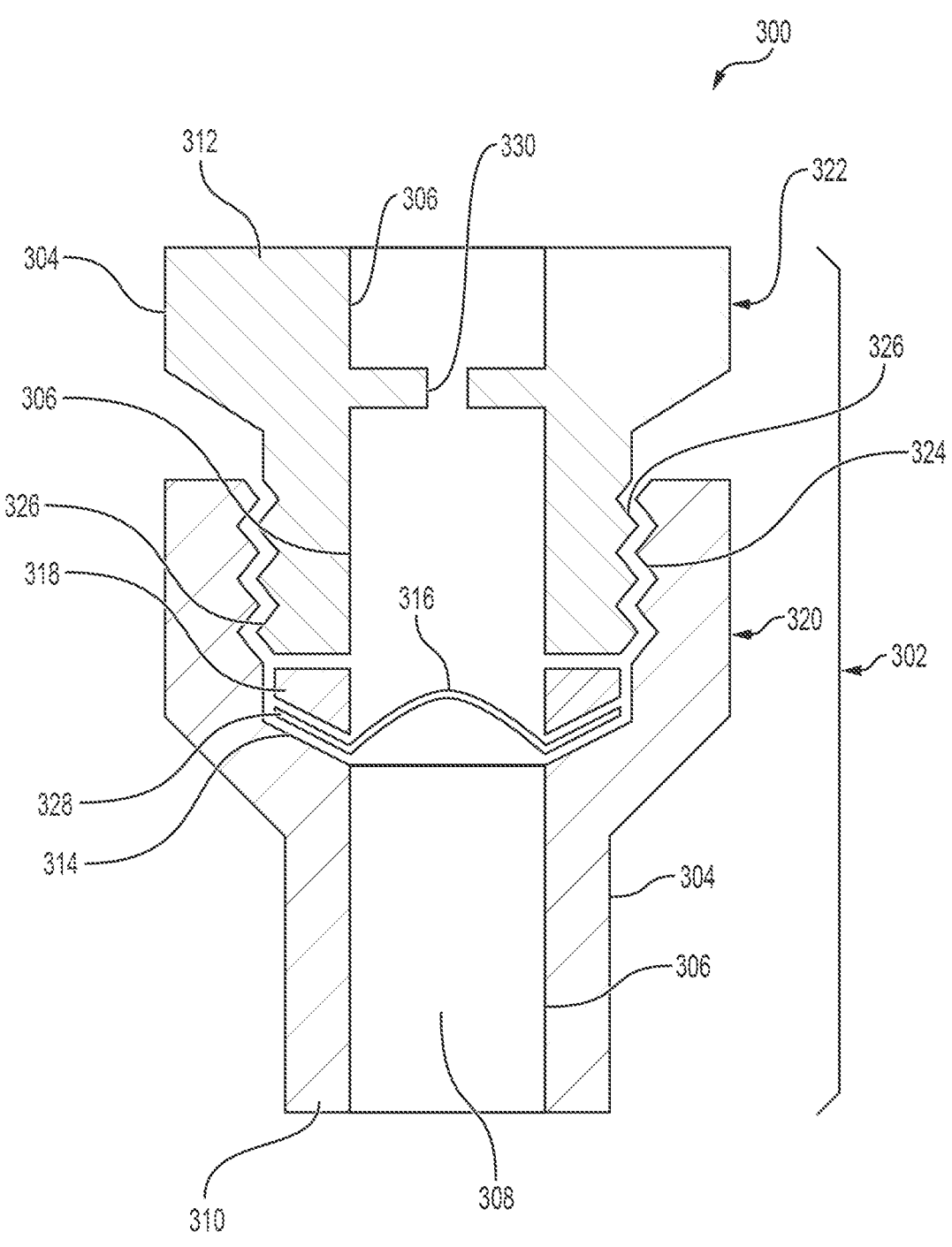
FIG. 3 is a cross-sectional view taken along the longitudinal centerline of a further embodiment of a pressure relief valve according to the disclosure.

Another relief valve embodiment according to the disclosure is shown in FIG. 3. Relief valve 300 has a body 302 with an exterior surface 304 and an interior surface 306 defining a generally longitudinal passageway 308 through which fluid can flow from an inlet 310 for receiving fluid at a relatively high pressure from a fluid source such as hot- or cold-water or other plumbing fixture to an outlet 312 where fluid exits relief valve 300 at a lower pressure than it enters inlet 310 for delivery to a faucet or other plumbing pipe or fixture, a valve seat 314 disposed on interior surface 306 and a rupture or burst disk 316 disposed over valve seat 314 across passageway 308 such that disk 316 is capable of preventing the flow of fluid through the passageway 308 when the fluid is below a predetermined pressure.

Rupture disk 316 is comprised of a material having a break strength which bursts at the predetermined pressure. Materials that can be used for rupture disk 316 are metal, plastic, such as polyethylene or polypropylene, or elastomers, such as butyl rubber. Stainless steel or other noncorroding material is preferred. Rupture disk 316 can be flat or concave. It also can have one or more scores or areas that are thinner or configured such that one or more of them break at a pressure that is less than the break strength of the disk material surrounding the one or more scores.

The material used for the rupture disk 316 without a score preferably has a break strength that is less than the pressure at which the weakest component in the building plumbing system in which relief valve 300 is disposed, as described relative to relief valve 100. If rupture disk 316 has a score in it, a material having a higher break strength could be used for rupture disk 316 so long as the score breaks at a break strength that is less than the break strength of copper pipe if a plumbing system with only copper pipe is used, or less than the break strength of plastic pipe if the plumbing system has some plastic pipe. In this way, relief valve 300 would remain closed until the force of the fluid in the inlet 310 exceeds rupture disk 316 break strength at which point it would break, relieving the pressure in the line so that other pipes, valves, or fixtures in the plumbing system do not break.

Rupture disk 316 can be held in place by soldering, screwing, gluing, or using other conventional means to hold it into place. Rupture disk 316 can be held in body 302 by retainer 318. Alternatively, relief valve 300 can have an inlet end 320 and a separate outlet end 322 each having threads that allow them to be threaded into one another with rupture disk 316 held in between.

More specifically, as shown in FIG. 3, relief valve 300 can comprise separate inlet and outlet ends 320 and 322 each with threads 324 and 326, inlet end threads 324 disposed on the interior of inlet end 320 adjacent to threads 326 on outlet end 322 so that outlet end 322 can be screwed into inlet end 320. Relief valve 300 has rupture disk 316 disposed in inlet end 320 across passageway 308 with retainer 318 disposed between rupture disk 316 and outlet end 322, securing rupture disk 316 in place against valve seat 314 by screwing outlet end 322 into inlet end 320.

Additionally, rupture disk 316 may have a flange 328 on its outer edge sized to be capable of being held by retainer 318 against valve seat 314. Flange 328 preferably is molded into rupture disk 316.

Alternatively, inlet end 320 and outlet end 322 can be threaded and configured so that inlet end 320 can be received threadably into outlet end 322 with retainer 318 held between outlet end 322 and rupture disk 316, and rupture disk 316 held against a valve seat inside outlet end 322.

Relief valve 300 may also have a flow limiter 330 disposed on interior surface 306 through which fluid can flow in a restricted manner from high-pressure inlet 310 to low-pressure outlet 312 when the pressure of the fluid in inlet 310 is high enough to burst rupture disk 316. Flow limiter 330 is sized and shaped like flow limiters 124 and 230 of relief valves 100 and 200, respectively. In FIG. 3, flow limiter 330 is disposed on the interior of outlet end 322 between outlet 312 and rupture disk 316.

Use of a flow limiters 124, 230 and 330 is preferred because, when relief valves 100, 200 and 300 open under pressurized conditions, they will prevent a large flow of fluid from flowing through the pipe which could overflow a tub or sink or other fixture and damage the building in which the relief valve is used.

One or more relief valves 100, 200 or 300 could be connected at two points on a pipe without any control valve or other fixture or plumbing component in between but near a control valve or other fixture or component. By doing so, the control valve or other plumbing fixture is protected from freezing. Alternatively, a relief valve 100, 200 or 300 could be connected to two pipes, one pipe supplying a control valve for a faucet, or other fixture, such as a shower mixing and control valve system, and one pipe connected to the downstream end of the control valve faucet or fixture. In doing so, relief valve 100, 200 or 300 relieves pressure and protects the pipe, control or other valve, or plumbing system component.

The predetermined pressure for activation of pressure relief valves 100, 200 and 300 is preferably less than about 1000 PSI for a building plumbing system with entirely copper piping. More preferably, the predetermined activation pressure used in relief valves 100, 200 and 300 installed in a building plumbing system with all copper piping will be between about 400 and about 995 PSI, and, even more preferably, between about 500 and about 995 PSI.

If the building plumbing system includes plastic PEX piping, then the predetermined activation pressure for relief valves 100, 200 and 300, preferably, should be less than about 500 PSI. If it is unknown what piping is used in a building plumbing system, then pressure relief valve 100, 200 or 300 used in the system preferably should have a predetermined activation pressure of less than about 500

PSI, and more preferably between about 200 and about 395 PSI, and, even more preferably, between about 300 and about 395 PSI.

Spring 104, 204 and rupture disk 316 preferably have activation pressures of less than the burst pressure of the weakest component in the building plumbing system. When spring 104, 204 and rupture disk 316 have activation pressures that are less than the weakest component in the building plumbing system, relief valves 100, 200 and 300 will activate and relieve the pressure in the building plumbing system before a burst results.

Control Valve System with a Relief Valve

Figure 4:
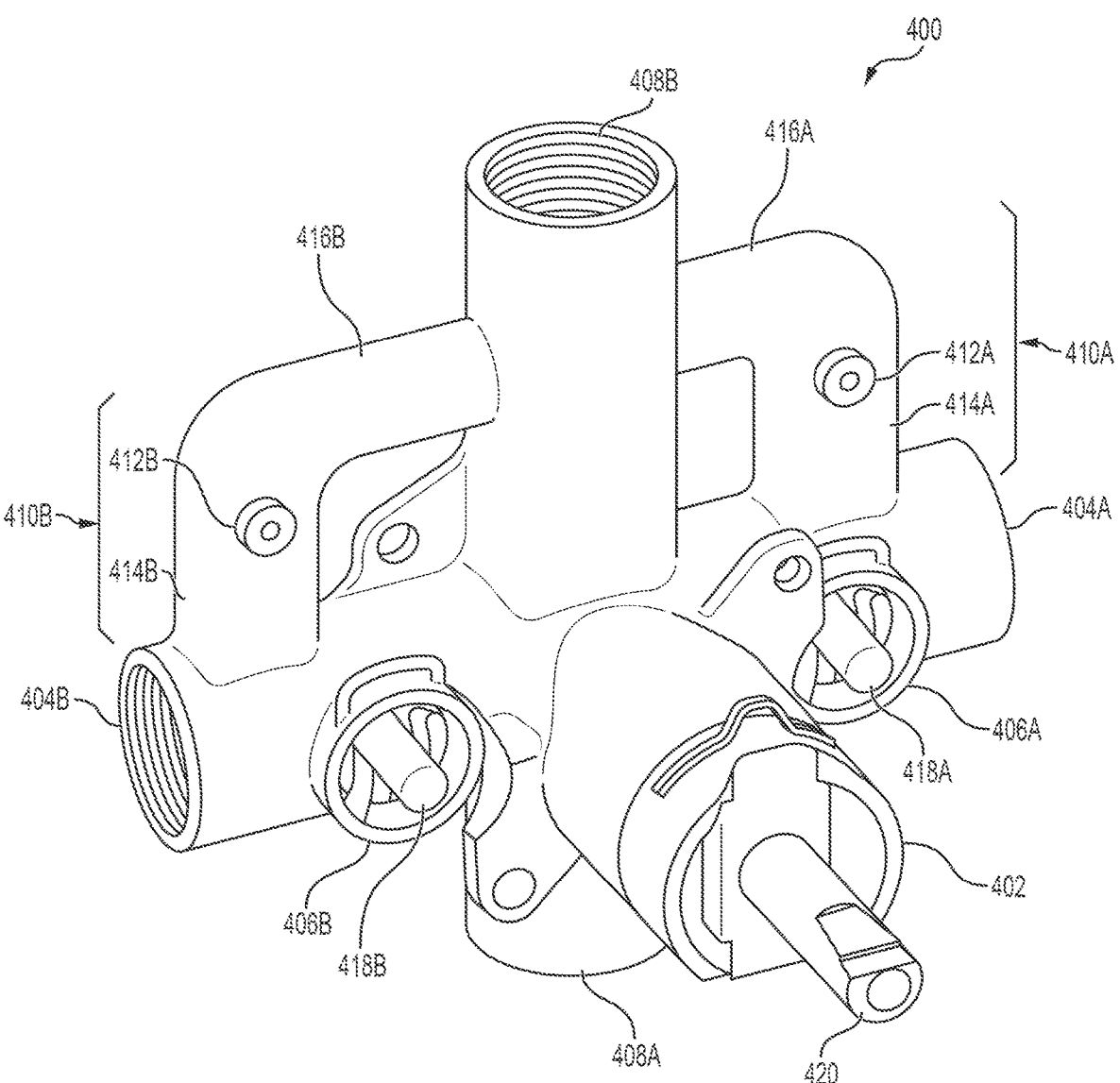
FIG. 4 is a perspective view of one embodiment of a valve system having a relief valve shown in FIG. 1, 2 or 3, according to the disclosure.

A pipe burst prevention valve system for use in a building plumbing system is described having a control valve and a relief valve 100, 200 or 300. For example, as shown in FIG. 4, pipe burst prevention valve system 400 according to the disclosure has a mixing and diverter valve 402 on which a faucet housing with a handle would be placed. FIG. 4 shows valve system 400 having two inlets from two high-pressure sources 404A and 404B, typically, cold- and hot-water lines, respectively, in fluid communication with control valves 406A and 406B, one for controlling cold water from cold-water line 404A and one for controlling hot water from hot-water line 404B, respectively, which each also would have a handle on the faucet housing for turning each control valve 404A and 404B on or off, two outlets 408A and 408B, and two bypasses 410A and 410B, each having a pressure relief valve 412A and 412B according to the disclosure, such as one of pressure relief valve 100, 200 or 300, an inlet 414A and 414B, with inlet 414A in fluid communication with control valve inlet 404A and inlet 414B in fluid communication with control valve inlet 404B, and an outlet 416A and 416B, with outlets 416A and 416B in fluid communication with outlet 408B.

Typically, for a valve system like that shown in FIG. 4, one outlet 408A would deliver water to a bathtub faucet, and the other outlet 408B would deliver water to a shower head, either at the same time or separately, depending upon mixing and diverting valve 402 and the position of the handle controlling it. Bypasses 410A and 410B will allow water to flow through them when the pressure in inlets 404A and 404B exceeds the force required to activate relief valve 412A or 412B thereby bypassing control valves 406A and 406B and mixing valve 402 and protecting them and the pipes in the building plumbing system from freezing. Bypass 410A or 410B could be in fluid communication with outlet 408A instead of 408B, or one could be connected to outlet 408A, and the other bypass could be connected to outlet 408B.

Spindles 418A and 418B are for attaching cold- and hot-water handles to control valves 406A and 406B, respectively, so that the valves can be operated. Spindle 420 is for attaching a mixing and diverting valve handle to the valve 402 to operate it.

Often, only the cold-water control valve inlet pipe is at risk of freezing in a domestic plumbing system, and not the hot-water control valve pipe inlet. In this case, a valve system could have only one bypass disposed to bypass the cold-water control valve and protect it from freezing. However, where there is a risk that the building plumbing system's hot water heating system could fail, or where the building heat could fail or both and there is a risk that the pipes will freeze, then a valve system with more than one bypass is preferred.

Preferably, valve system 400 has spring-operated relief valve embodiments 100 and 200 as relief valves 412A and 412B in bypasses 410A and 410B because they will continue to protect a building plumbing system after a freezing event. Once a frozen pipe thaws and the pressure of the building plumbing system returns to normal, relief valves 100 and 200 close and water no longer would flow through them, but they will open again if the pipes freeze again. Relief valve 300, however, is preferred where space and cost are limiting factors.

Bypasses 410A and 410B according to the disclosure can also have relief valves 100, 200 or 300 within a Y-type access pipe having an access port which would allow the relief valves 100, 200 or 300 to be inspected and serviced with minimal downtime for the plumbing system. Relief valve 100, 200 or 300 needing to be replaced could be removed or replaced using the access port. This is especially important for relief valve 300 which will no longer function to relieve pressure in the pipe once its rupture disk 316 has burst. Therefore, relief valve 300, once ruptured, will need to be replaced to permit valve system 400 to operate as described and to continue to protect the plumbing system or its pipes or other components from freezing.

Figure 5:
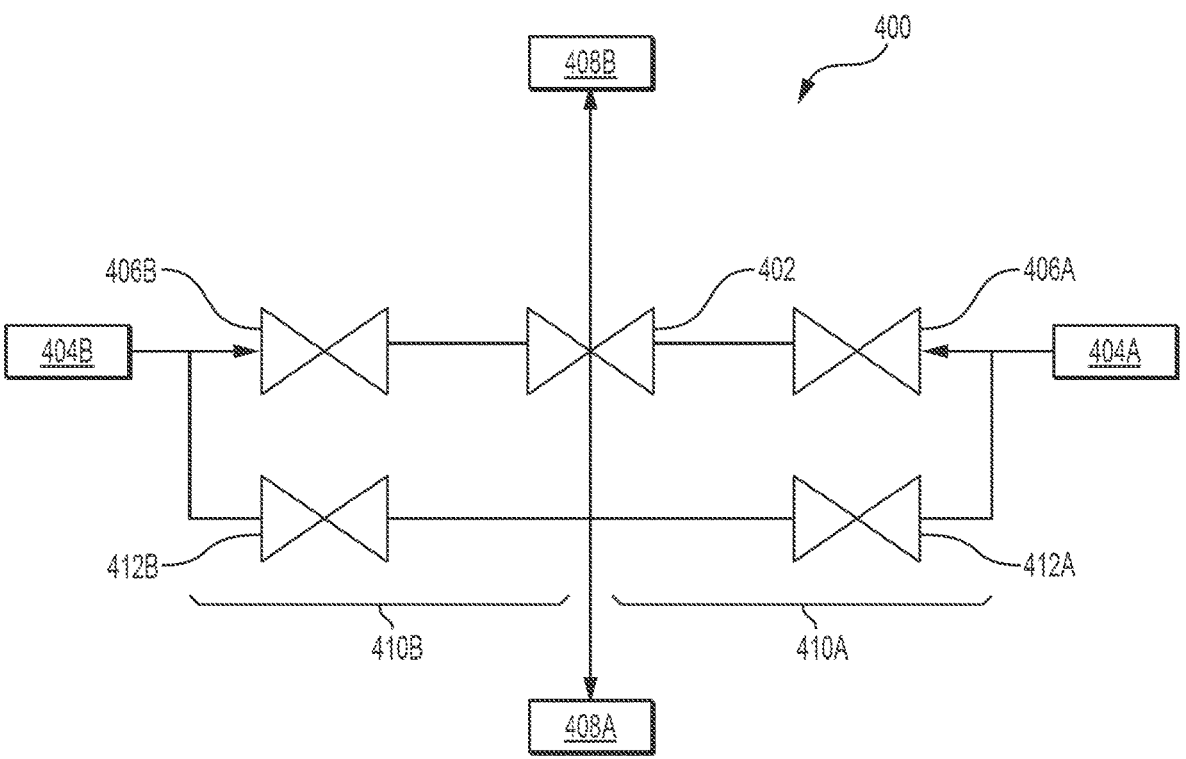
FIG. 5 is a flow diagram depicting the flow of fluid through a valve system according to FIG. 4.

FIG. 5 is a flow chart showing the flow of fluid through a valve system 400, shown in FIG. 4. In FIG. 5, fluid flows through the pipe burst prevention valve system 400 from two inlets from two high-pressure fluid sources 404A and 404B, typically, cold- and hot-water lines, respectively, in fluid communication with control valves 406A and 406B, one for controlling cold water from cold-water line 404A and one for controlling hot water from hot-water line 404B, respectively, to outlets 408A and 408B, depending upon the position of the mixing and diverter valve 402. Fluid flows through bypasses 410A and 410B, each having a pressure relief valve 412A and 412B according to the disclosure such as one of pressure relief valve 100, 200 or 300, when the pressure of the fluid in inlets 404A or 404B is at or above the activation force of relief valve 412A or 412B thereby bypassing control valves 406A and 406B and mixing valve 402 and protecting them and the pipes connecting them to the building plumbing system from freezing by allowing fluid to flow through outlet 408A. In FIG. 5, outlet 408A could be a bathtub faucet and outlet 408B could be a shower faucet.

Figure 6:
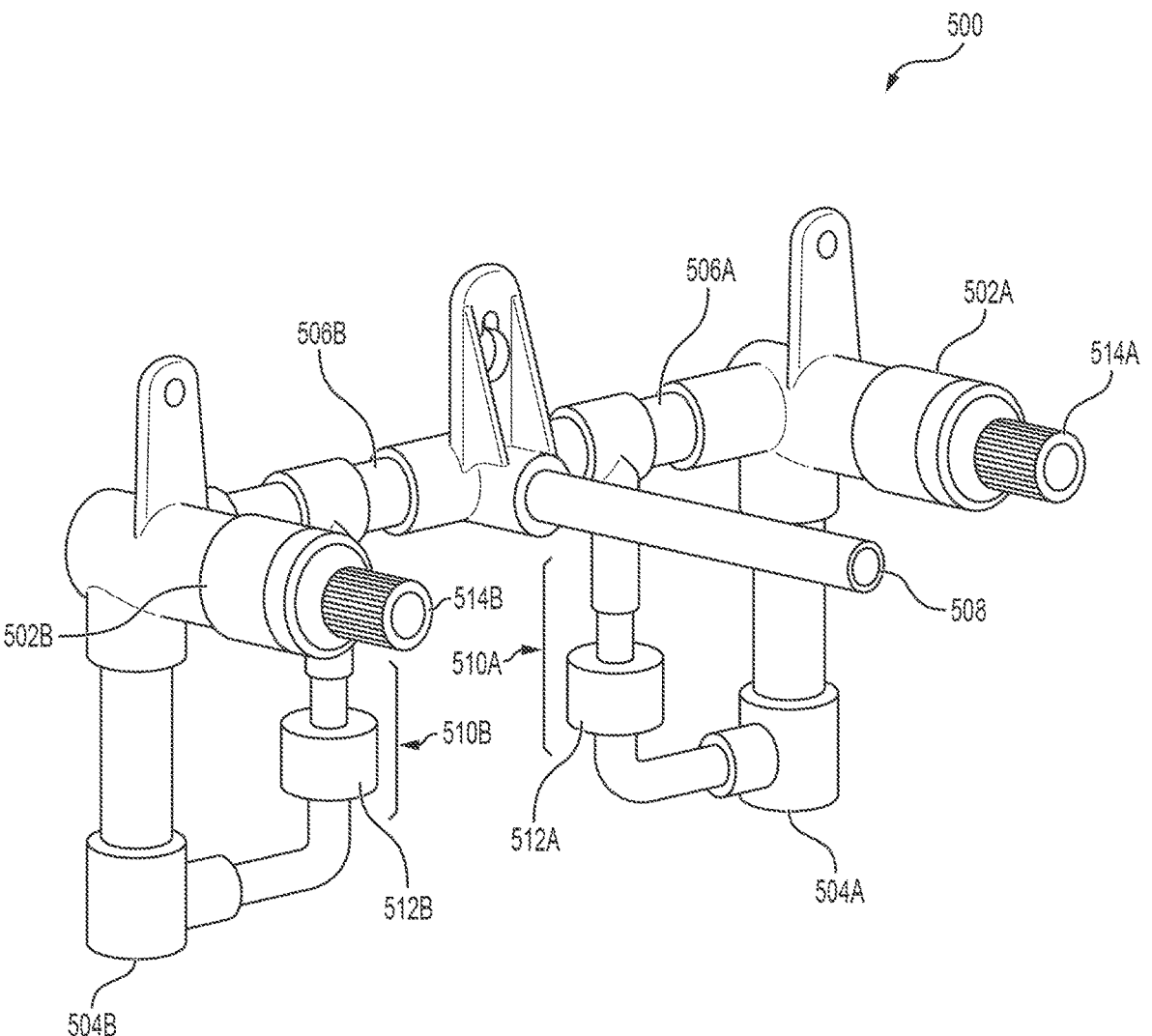
FIG. 6 is a perspective view of an alternative embodiment of a valve system according to the disclosure.

FIG. 6 is a perspective view of an alternative embodiment of a valve system according to the disclosure. Valve system 500 shown in FIG. 6 comprises two control valves for controlling the flow of fluid 502A and 502B from an inlet from a high-pressure cold-water source 504A and from a high-pressure hot-water source 504B, respectively, and each such control valve 502A and 502B having outlets 506A and 506B, respectively, which combine into one control valve system outlet 508, such as a faucet for a bathtub or shower. Valve system 500 further has two bypasses 510A and 510B each having a pressure relief valve 512A and 512B according to the disclosure, respectively, such as one of embodiments 100, 200, or 300 shown in FIG. 1, 2 or 3, disposed in fluid communication with control valve inlets 504A and 504B and control valve outlets 506A and 506B. System 500 also has spindles 514A and 514B configured to receive handles to aid in turning control valves 502A and 502B on and off.

Figure 7:
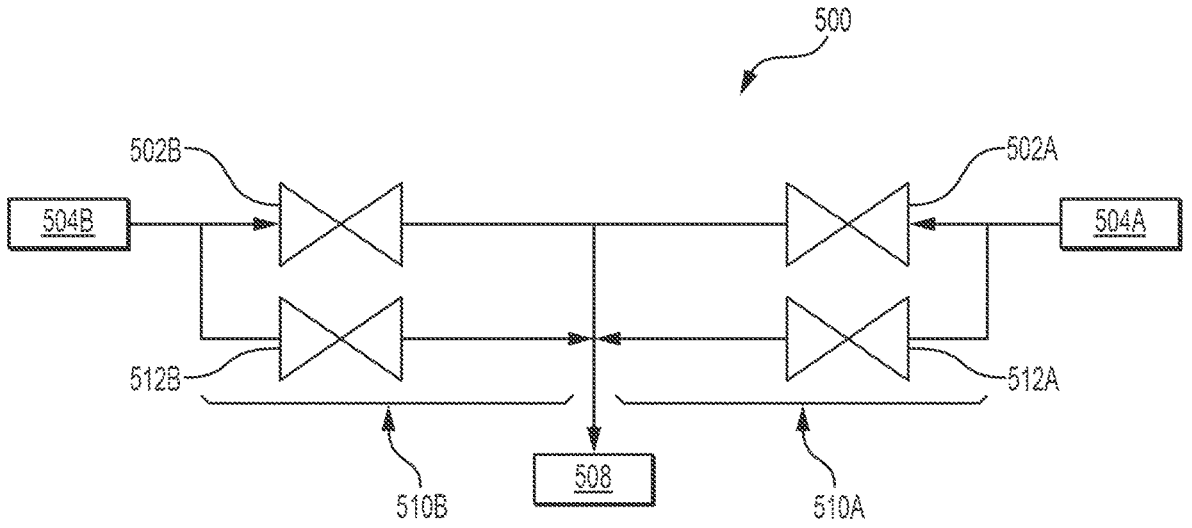
FIG. 7 is a flow diagram depicting the flow of fluid through a valve system according to FIG. 6.

FIG. 7 is a flow diagram showing the flow of fluid through valve system 500, which has control valves 502A and 502B for controlling the flow of fluid from high-pressure inlets 504A and 504B, respectively, and flowing out to a combined control valve system outlet 508, and two bypasses 510A and 510B disposed in fluid communication with inlets 504A and 504B, respectively, and control valve system outlet 508, each bypass 510A and 510B having a relief valve 512A or 512B, according to the disclosure. System 500 could have only one bypass, preferably on the cold-water source side of system 500, instead of two as shown.

Another embodiment according to the disclosure is a control valve system that includes another low-pressure delivery pipe end, not shown in FIG. 6 or 7. In yet another embodiment according to the disclosure a diverter that may be operated between one or more deliver end pipes, such as where a shower has multiple shower heads, which diverts the water from a first low-pressure delivery pipe to a second low-pressure delivery pipe or more low-pressure delivery pipes, and back again. For example, such a diverting valve could be advantageously used to divert water being delivered from one location to another or to two or more locations, such as a bathtub to a shower or multiple shower heads.

In yet another embodiment, the system can include a mixing valve that mixes and moderates hot- and cold-water delivered to the mixing valve. Such a mixing valve also can be pressure controlled. Such a mixing valve can also have a diverting function. Such a mixing valve also may not have a diverting function and be used to deliver water to a diverter valve.

Figure 8:
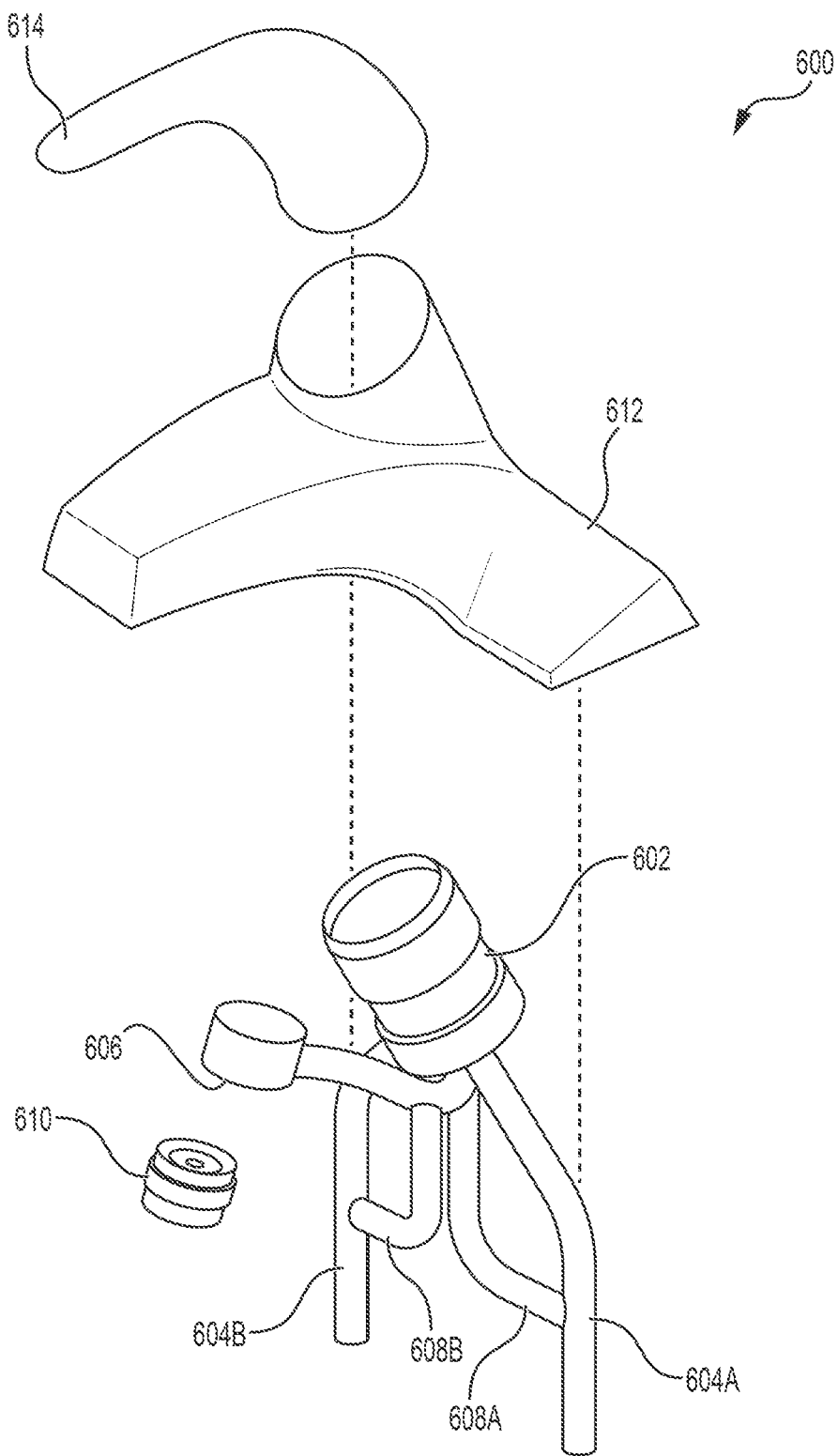
FIG. 8 is an exploded perspective view of another embodiment of a valve system according to the disclosure.

FIG. 8 is an exploded perspective view of another embodiment of a control valve system according to the disclosure. In FIG. 8, valve system 600 has a cartridge 602 that receives fluid from fluid sources through inlets 604A and 604B and mixes them as well as controls their volume and allows the fluid to exit from a single outlet 606. Valve system 600 also has two bypasses, 608A and 608B, in fluid communication with inlets 604A and 604B, respectively, and control valve system outlet 606. Valve system 600 also is shown having an aerator 610. Valve system 600 has faucet housing 612 which is disposed over cartridge 602 and out of which fluid flows through outlet 606 and has a handle 614 for controlling fluid flow from inlets 604A and 604B, center lines of which are shown in dashed lines, through cartridge 602. Bypasses 608A and 608B have a relief valve according to the disclosure, such as relief valve 100, 200 or 300.

In addition, a valve system according to the disclosure could include additional outlets, additional mixing, control valves, such as thermostatic and pressure control valves, as well as a bypass with a pressure relief valve according to the disclosure, such as relief valve 100, 200 or 300. Further, valve system 400, 500, and 600 could also include in bypasses 410A, 410B, 510A, 510B, 608A and 608B a Y-type access port disposed to allow relief valves 412A, 412B, 512A, 512B, 608A, and 608B to be serviced.

Valve systems 400, 500, and 600 can be made by soldering, screwing, or clamping the components described in relation to them to pipes in fluid communication with them. Alternatively, they can be made by molding the valves and bypasses into an assembly and attaching the assembly using fittings or soldering the assembly to pipes in fluid communication with the building plumbing system. Relief valves and cartridges may be made removable and replaceable by threading or using O-rings. Preferably, a valve system according to the disclosure is molded such that bypasses are integral and generally parallel to the valve that they bypass so that they are compact enough to be installed in a two-by-four wall, typical in residential dwelling walls, like conventional shower or tub wall mixing, diverter and control valves can be installed, yet the valve system shall be molded such that the relief valve and any cartridge shall be removable so that they can be replaced when necessary. The valve system according to the disclosure advantageously can also be installed in a wall on the exterior of a residential dwelling because it is protected against freezing.

Control Valve Cartridge with a Split Stem and a Washer

Figure 9:
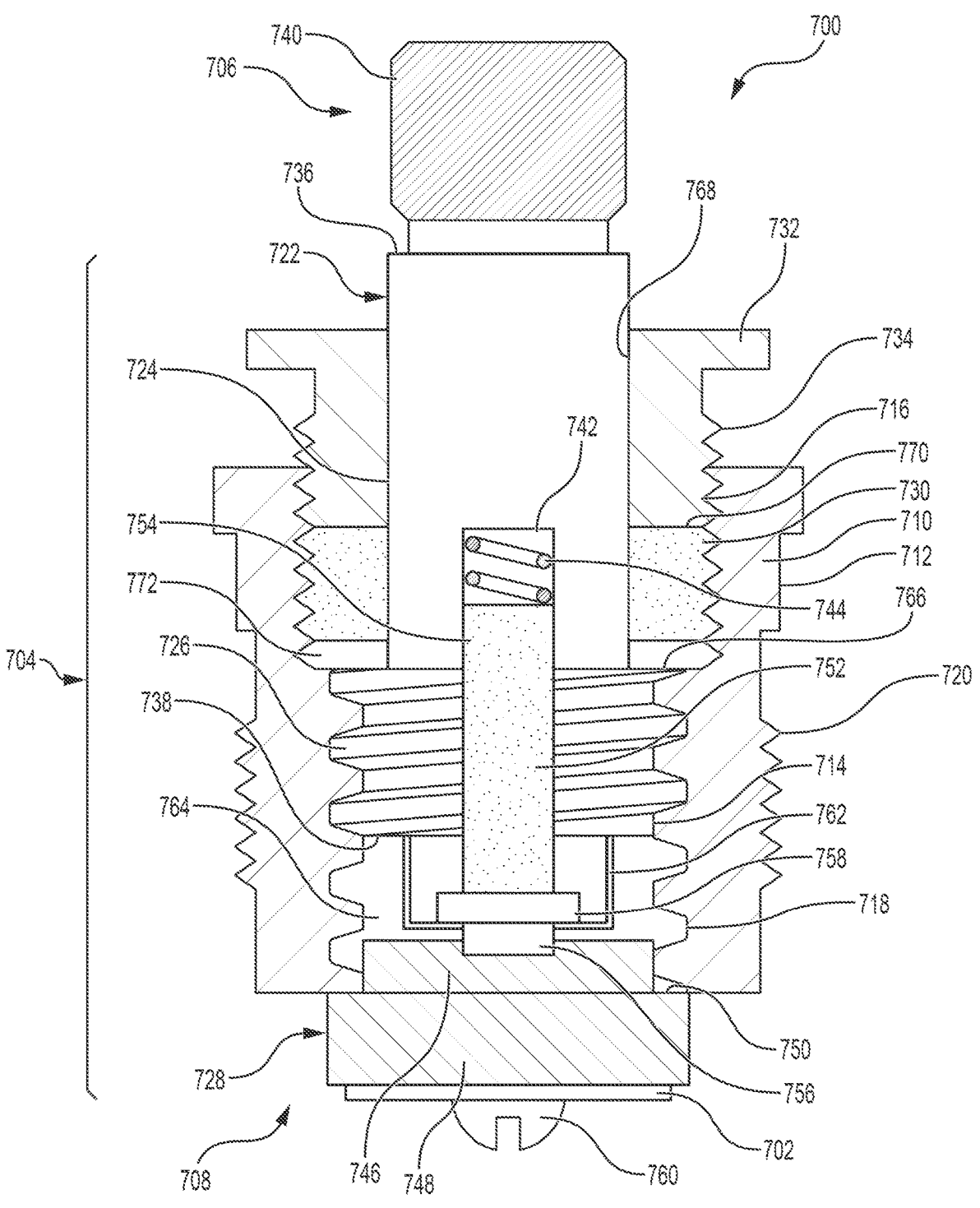
FIG. 9 is a cross-sectional view taken along the longitudinal centerline of one embodiment of a control valve cartridge according to the disclosure.

Pipe bursts due to freezing also can be prevented by using a compact, pipe-burst-prevention fluid control valve cartridge according to the disclosure for use with a fluid control valve faucet for controlling the flow of fluid having a pressure in a plumbing system. One embodiment of such a cartridge is a generally cylindrical control valve cartridge 700, as shown in FIG. 9, having a washer 702 and a split stem 704. More particularly, cartridge 700 has a stem end 706 opposite a valve end 708, a cartridge body 710 that has exterior and interior surfaces 712 and 714, respectively, with upper and lower interior threads 716 and 718, upper interior threads 716 toward cartridge upper stem end 706 and lower interior threads 718 toward cartridge valve end 708, and cartridge body 710 further has exterior threads 720 toward cartridge valve end 708 configured to be capable of being screwed into faucet housing to hold cartridge 700 in place in the faucet housing. Cartridge 700 has split stem 704 having an upper stem 722 with a generally cylindrical exterior surface 724 with threads 726 thereon adjacent to cartridge interior surface lower end threads 718, and a shoulder 766 formed between stem threads 726 extending beyond upper stem exterior surface 724.

Cartridge 700 further can have a packing 730 disposed around upper stem exterior surface 724 on upper stem thread shoulder 766, and a packing nut 732 having an interior surface 768 configured to be capable of rotatably receiving upper stem 722, threads on its exterior surface 734 configured to be capable of being threaded into upper interior cartridge body threads 716, and a lower end 770 capable of resting on stem thread shoulder 766 when the spindle 740 is turned to its fully open position. Cartridge 700 further can have a stop 772 disposed on shoulder 766 of upper stem threads 726 and, in this case as shown in FIG. 9, packing 730 is disposed on stop 772 and packing nut 732 is configured to screw into body 710 with packing nut lower end 770 abutting packing 730, and packing 730 abutting stop 772.

Upper stem 722 has an upper end 736 toward the cartridge stem end 706 and a lower end 738 toward the valve end 708 of the cartridge 700. The upper stem 722 has a spindle 740 on which a handle for a faucet may be attached. Upper stem 722 also has a generally cylindrical interior cavity 742 extending from the upper stem lower end 738 toward the upper stem upper end 736, a calibrated spring 744 disposed in cavity 742 toward the upper stem upper end 736, and a clip 762 attached to upper stem lower end 738 adjacent to cavity 742. Preferably, upper stem lower end 738 has at least two clips 762 opposing one another on opposite sides of cavity 742.

Cartridge split stem 704 also has a lower stem 728 toward cartridge valve end 708 with generally cylindrical upper end and lower ends 746 and 748, respectively, the lower end 748 having a diameter that is larger than the diameter of upper end 746 thereby forming a shoulder 750. Lower stem upper end 746 has a diameter that is sized so that it is capable of sliding into and being received by cartridge body interior 714 at its valve end 708. Lower stem 728 also has a piston 752 having an upper end 754, a lower end 756 attached to the upper end of the lower stem 746 and having a flange 758 adjacent to piston lower end 756, and a retaining screw 760 attaching washer 702 to the lower stem lower end 748. Piston 752 can be formed integrally with the lower stem lower end 748 or it can be screwed or soldered onto it. Alternatively, two or more of lower stem upper end 746, lower stem lower end 748 and piston 752 could be molded together as one piece.

Piston 752 has a size such that it is capable of slidably being received within cavity 742 and holding a calibrated spring 744 in cavity 742 at its upper end 754. Piston 752 is capable of sliding between a fully extended position toward valve end 708, held by a piston retaining clip 762 on flange 758 and thereby defining a gap 764 between lower stem upper end 746 and upper stem lower end 738, and fully compressed position, wherein lower stem 728 is compressed upward toward stem end 706 until shoulder 750 rests on cartridge body 710 at its valve end 708.

Cartridge 700 can be used in single-spindle compression washer control valves, like valves 406A and 406B, shown in FIG. 4, and valves 502A and 502B, shown in FIG. 6. Cartridge 700 is used by inserting its valve end 708 into a control valve of a faucet and screwing it into the faucet so that washer 702 and valve end 708 rest on the valve seat of the faucet. Cartridge 700 may not have exterior threads 720 which screw into the valve but rather may have an O-ring that friction fits into the faucet valve. When faucet is opened and closed by turning the handle of the faucet attached to spindle 740, upper stem 722 rotates freely within packing nut 732 and moves in threads 726 toward cartridge stem end 706 or valve end 708 on interior threads on lower valve end 718, which raises or lowers valve end 708 of the split stem 704 off or onto valve seat to allow or prevent the flow of fluid through the valve.

Piston 752 may be configured to rotate with upper stem 722 when spindle 740 is rotated to open or close the valve yet slide longitudinally relative to upper stem 722. In that case, piston 752 would have an elongate protrusion or key on the exterior of piston 752 extending radially outward toward and longitudinally down a portion of the length of piston 752, and cavity 742 would have a complementary recess in it that is configured to longitudinally, slidably receive the piston key and hold it fixed relative to upper stem 722 when it is rotated thereby rotating lower stem 728 and washer 702 when spindle 740 is rotated.

When faucet handle on spindle 740 is turned to open the valve, fluid flows from the building plumbing system past washer 702 and valve seat. In FIG. 4, when spindle 418A or 418B are turned, washer (not shown) raises, and fluid flows past valves 406A or 406B and out faucet outlet 408A or 408B depending upon the position of mixing valve 420. In FIG. 6, when spindle 514A or 514B is turned, washer (not shown) would raise, and fluid would flow past valve 502A or 502B and out faucet outlet 508. In each case, where cartridges disclosed are included in a valve system of a building plumbing system, opening the valve by turning the spindle would allow water to flow from the building plumbing system water source through outlet to be used by an end user. In each case, closing the valve by turning the spindle prevents water from flowing from the building plumbing system water source through outlet to an end user under normal fluid pressure conditions but, under freezing conditions, fluid pressure increases above the predetermined pressure and water will flow to an outlet.

Figures 10A, 10B, 10C:
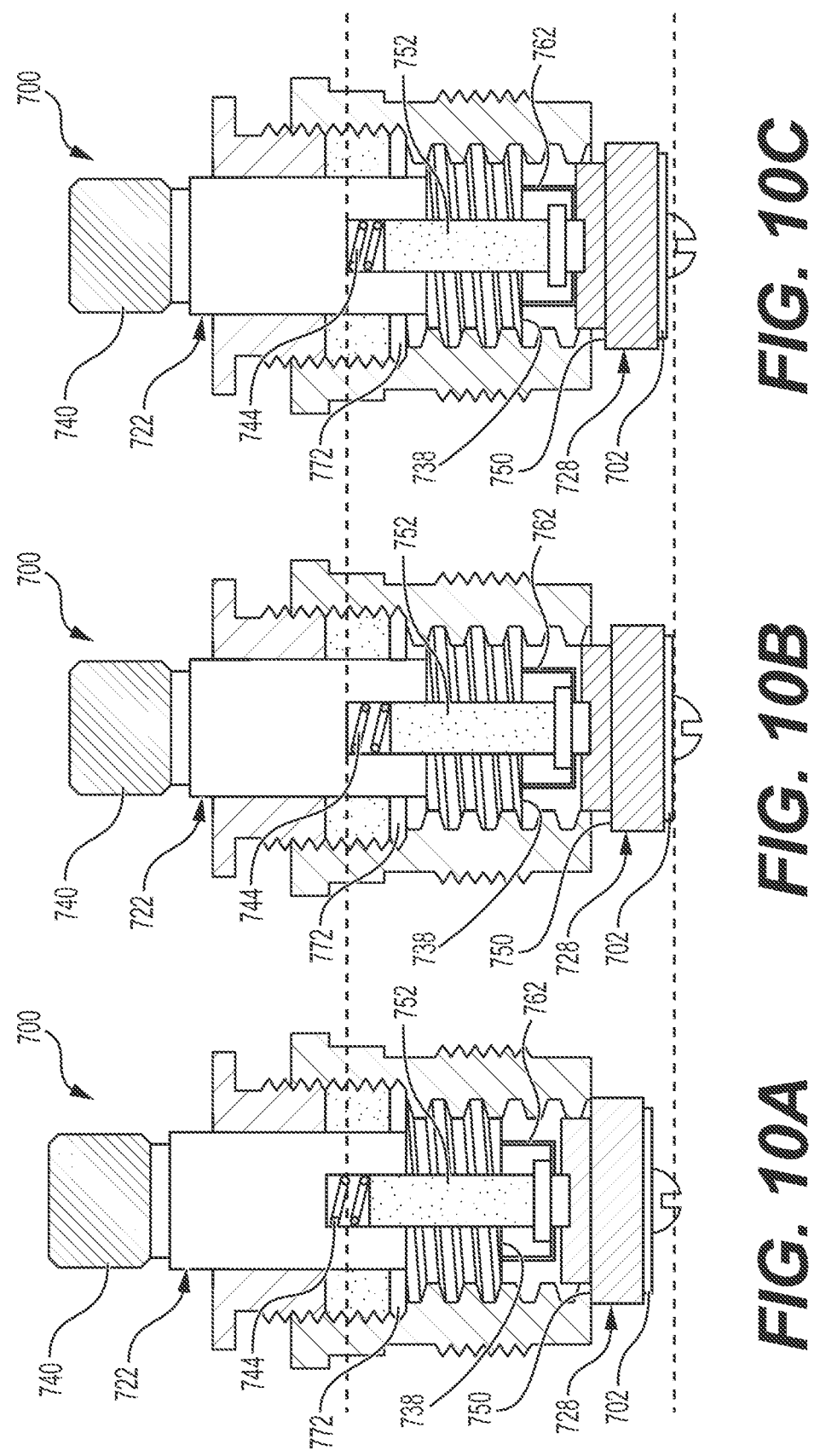
FIGS. 10A, 10B and 10C depict cross-sectional views of the cartridge embodiment shown in FIG. 9 with the split stem in different positions.

FIG. 10A shows cartridge 700 under normal fluid pressure conditions in a valve in its fully open position. Under these conditions, as shown in FIG. 10A, when spindle 740 has been turned to open the valve and raise upper stem 722 and washer 702 off faucet valve seat (represented by dashed line), shoulder 750 rests on cartridge body 710. In this position, fluid can flow through the valve past washer 702.

FIG. 10B shows cartridge 700 under normal fluid pressure conditions in a valve with cartridge 700 in its fully closed position. Under these conditions, as shown in FIG. 10B, when spindle 740 has been turned to close the valve and lower upper stem 722, washer 702 rests on faucet valve seat (again represented by dashed line). In this position, fluid is prevented from flowing through the valve and past washer 702.

FIG. 10C shows cartridge 700 with its stem 722 in its fully closed position but under pressurized fluid conditions. Under these conditions, as shown in FIG. 10C, spindle 740 has been turned to its closed position which advances upper stem 722 in cartridge body too its extended position off of but lower stem 728 and washer 702 are pushed up off of the faucet valve seat (shown by dotted line) by pressurized fluid which exceeds the compressive force of spring 744, and activation pressure or predetermined pressure of cartridge 700, in turn pushing up piston 752 into cavity 742 allowing fluid to flow in the pipe past cartridge valve end 708 and valve seat, and through the valve.

Cartridge 700 is configured, and the lengths of cavity 742, spring 744 and piston 752 are sized so that when spindle 740 is in its fully closed position but the valve is under pressurized conditions, the fluid pressure exceeds the predetermined pressure, and lower stem lower end 748 raises off valve seat so as to allow at least some fluid to flow through the valve. Preferably, cartridge 700 is configured and the lengths of cavity 742, spring 744 and piston 752 are sized so that when spindle 740 is in its fully closed position but fluid pressure in the valve exceeds the predetermined pressure, lower stem lower end 748 raises off valve seat by an amount that is less than it raises off the valve seat when spindle 740 is turned to fully open the valve. More preferably, cartridge 700 is configured and the lengths of cavity 742, spring 744 and piston 752 are such that when spindle 740 is in its fully closed position but fluid pressure in the valve exceeds the predetermined pressure, lower stem lower end 748 raises off valve seat by a distance that allows between about 50% to about 80% less than the normal flow of fluid through the valve when the valve is open, or by a distance that allows between about 0.25 and about 1.25 GPM and about 0.10 and about 0.50 GPM to flow through the valve. Even more preferably, cartridge 700 is configured and the lengths of cavity 742, spring 744 and piston 752 are such that when spindle 740 is in its fully closed position but fluid pressure in the valve exceeds the predetermined pressure, lower stem lower end 748 raises off valve seat by a distance that allows an amount of fluid to flow through the valve that is less than about 0.4 GPM.

Spring 744 has a compressive force so that cartridge 700 is capable of relieving pressure in the building plumbing system at the desired predetermined pressure. Thus, spring 744 is capable of compressing when the pressure of the fluid in cartridge 700 exceeds predetermined pressure. Spring 744 should have a predetermined activation pressure as described above according to the type of pipes and components in the building plumbing system.

Control Valve Cartridge with a Split Stem and Ceramic Disks

Figure 11:
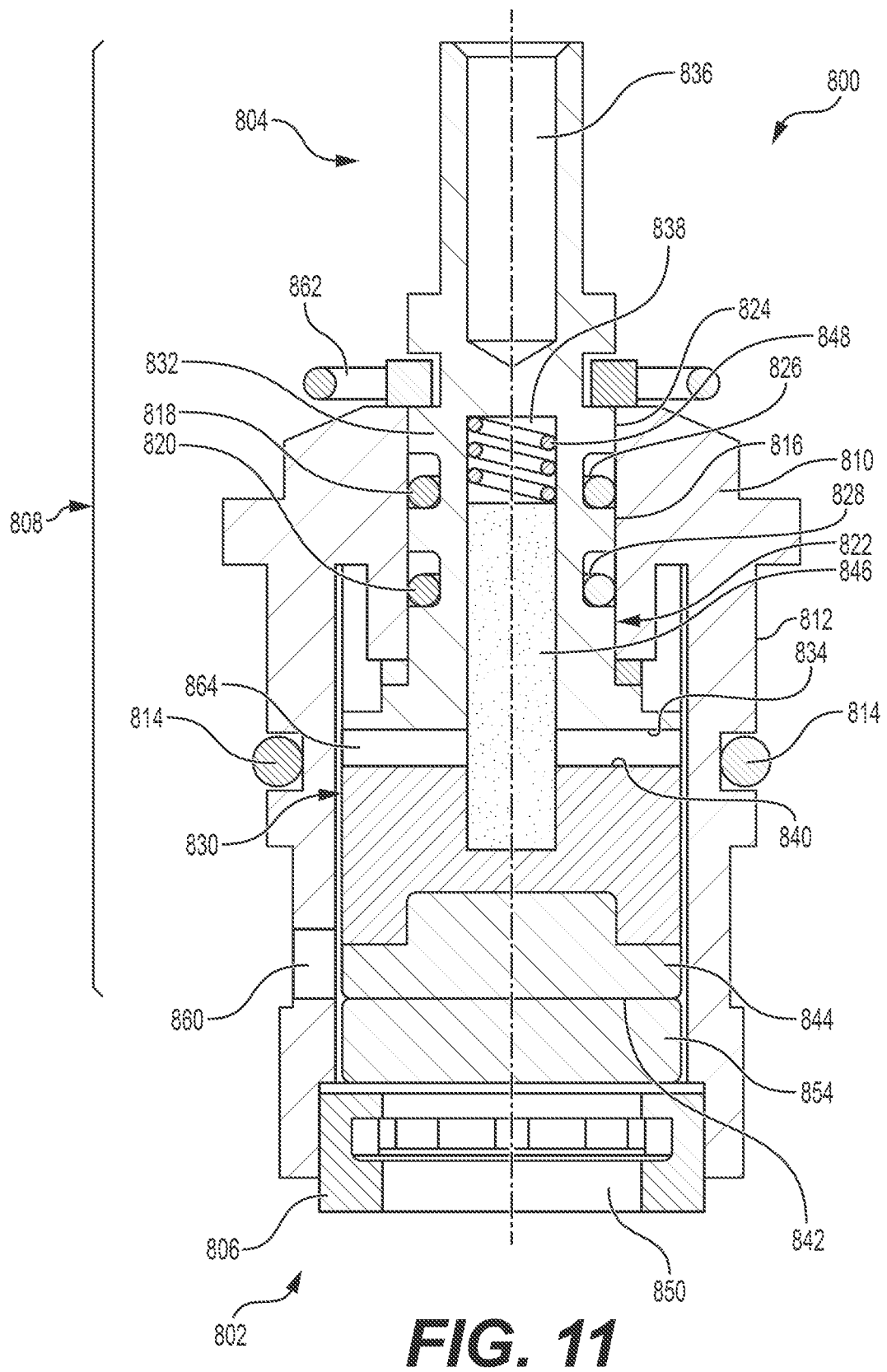
FIG. 11 is a cross-sectional view taken long the longitudinal centerline of another embodiment of a control valve cartridge according to the disclosure.

Another cartridge embodiment according to the disclosure is shown in FIG. 11. FIG. 11 depicts a generally cylindrical control valve cartridge 800 for a single spindle control valve having a valve end 802 and a stem end 804 generally opposite each other along a longitudinal axis (shown in dashed line) through the center of cartridge 800, a cartridge base 806 at valve end 802, and a split stem 808. Cartridge 800 also has a body 810 that has an exterior surface 812 with an O-ring 814 on it, cartridge body exterior surface 812 being shaped to receive O-ring 814 and friction fit into a faucet valve, and an interior surface 816 that is sized to hold split stem 808 with the assistance of two O-rings 818 and 820 for holding and sealing split stem 808 to the cartridge body interior surface 816.

Split stem 808 has an upper stem 822 with a generally cylindrical exterior surface 824 with recesses 826 and 828 each sized to receive O-ring 818 and 820 and hold and seal upper stem 822 in cartridge body 810. Split stem 808 also has a lower stem 830 toward valve end 802 adjacent to upper stem 822.

Upper stem 822 has an upper end 832 adjacent to the cartridge stem end 804, a lower end 834 distal to upper stem upper end 832, and a spindle 836 on which a handle for a faucet may be attached and used to rotate spindle 836 and split stem 808 to open the valve and turn the faucet on or off. Upper stem 822 also has interior cavity 838 extending longitudinally through upper stem 822 from its lower end 834 toward upper stem upper end 832.

Lower stem 830 has an upper end 840 adjacent to upper stem lower end 834 and a lower end 842 having a ceramic control disk 844. Lower stem 830 also has piston 846 disposed on lower stem upper end 840 and extending longitudinally into cavity 838 toward stem end 804.

Piston 846 can be formed integrally with lower stem upper end 840. Alternatively, piston 846 can be screwed or soldered on to lower stem upper end 840 to affix it to lower stem 830.

Cartridge 800 also has pressure relief spring 848 disposed in cavity 838 and held in place by piston 846. Spring 848 has a compressive force that allows cartridge 800 to relieve pressure in the building plumbing system at the desired predetermined pressure. Thus, spring 848 is capable of compressing when the pressure of the fluid in cartridge 800 exceeds the predetermined pressure. Spring 848 has a predetermined activation pressure as described above according to the type of pipes and components in the building plumbing system.

Cartridge base 806 is fixedly disposed on interior surface of cartridge body 816 at its valve end 802 across a high-pressure inlet 850 and has at least one opening through which fluid may flow from a high-pressure source, such as a hot- or cold-water source. Cartridge base 806 holds a ceramic cartridge base 854 in cartridge body 810 at its valve end 802. Ceramic cartridge base 854 also has at least one opening through which fluid from opening in base 806 may flow.

Ceramic control disk 844 is disposed on lower stem 830 at its lower end 842 and forced toward ceramic cartridge base 854 by piston 846 under the force of spring 848. Ceramic control disk 844 has at least one opening configured to allow fluid to flow from inlet 850 through opening in ceramic cartridge base 854 if ceramic control disk 844 is rotated to align its opening with low-pressure outlet 860 and to prevent the flow of fluid from inlet 850 to outlet 850 if ceramic control disk 844 is rotated the opposite way thereby misaligning opening in control disk 844 with outlet 860.

Cartridge 800 further has retaining ring 862 that rotatably holds upper stem 822 in cartridge body 810 at its stem end 804 thereby holding spring 848 and piston 846 in cavity 838, and lower stem 830 against ceramic cartridge base 854. Ceramic cartridge base 854 in turn is fixedly held against cartridge base 806 in cartridge body 810 by conventional means. Retaining ring 862 and cartridge base 806 may be held in place by screwing them into place, by friction fitting them into place using O-rings, or by any other conventional means.

Piston 846, cavity 838 and pressure relief spring 848 have diameters such that piston 846 and spring 848 can slide into cavity 838. Piston 846, cavity 838 and spring 848 have lengths such that a portion of piston 846 is capable of sliding into cavity 838 and holding spring 848 therein between a fully extended position, wherein lower stem 830 is held by ceramic cartridge base 854 against the force of spring 848 under normal fluid pressure conditions and thereby defining a stem gap 864 in split stem 808 between upper stem 822 and lower stem 830, and a fully retracted position, when the pressure of the fluid at the valve end exceeds the predetermined pressure thereby compressing spring 848, closing stem gap 864, and defining a ceramic disk gap 866 between ceramic control disk 844 and ceramic cartridge base 854 when the pressurized fluid forces control disk 844 upward forcing lower stem 830 toward upper stem lower surface 834, closing stem gap 864, defining ceramic disk cap 866, and allowing an amount of fluid to flow out of cartridge 800 through low pressure outlet 860.

Preferably, cartridge 800 is configured and the lengths of piston 846, cavity 838, pressure relief spring 848, upper end of lower stem 840 and ceramic control disk 844 are sized so that when the fluid pressure exceeds the predetermined pressure, lower stem lower end 842 raises off of ceramic base 854 so as to allow an amount of fluid to flow from cartridge inlet 850 to cartridge outlet 860 that is less than that the amount of fluid that would flow through the outlet 860 when spindle 836 is in its fully open position and the valve is fully open. More preferably, cartridge 800 is configured and the lengths of piston 846, cavity 838, pressure relief spring 848, upper end of lower stem 840 and ceramic control disk 844 are sized so that when the fluid pressure in the valve exceeds the predetermined pressure, lower stem lower end 842 raises off of ceramic base 854 by an amount that restricts the flow of fluid through outlet 860 to an amount that is between 50% and about 80% less than the normal flow of fluid through the valve when the valve is in its fully open position, or by a distance that allows between about 0.25 and about 1.25 GPM and about 0.10 and about 0.50 GPM to flow through the valve. Even more preferably, cartridge 800 is configured and the lengths of piston 846, cavity 838, pressure relief spring 848, upper end of lower stem 840 and ceramic control disk 844 are sized so that when the fluid pressure exceeds the predetermined pressure, lower stem lower end 842 raises off of ceramic cartridge base 854 by a distance that allows an amount of fluid to flow from cartridge inlet 850 to cartridge outlet 860 that is less than about 0.40 GPM. Additionally, the length of lower stem 830 can be sized to define a larger or small ceramic disk gap 866, which in turn also allows or restricts more or less of the fluid flow through low-pressure outlet 860.

Figure 12:
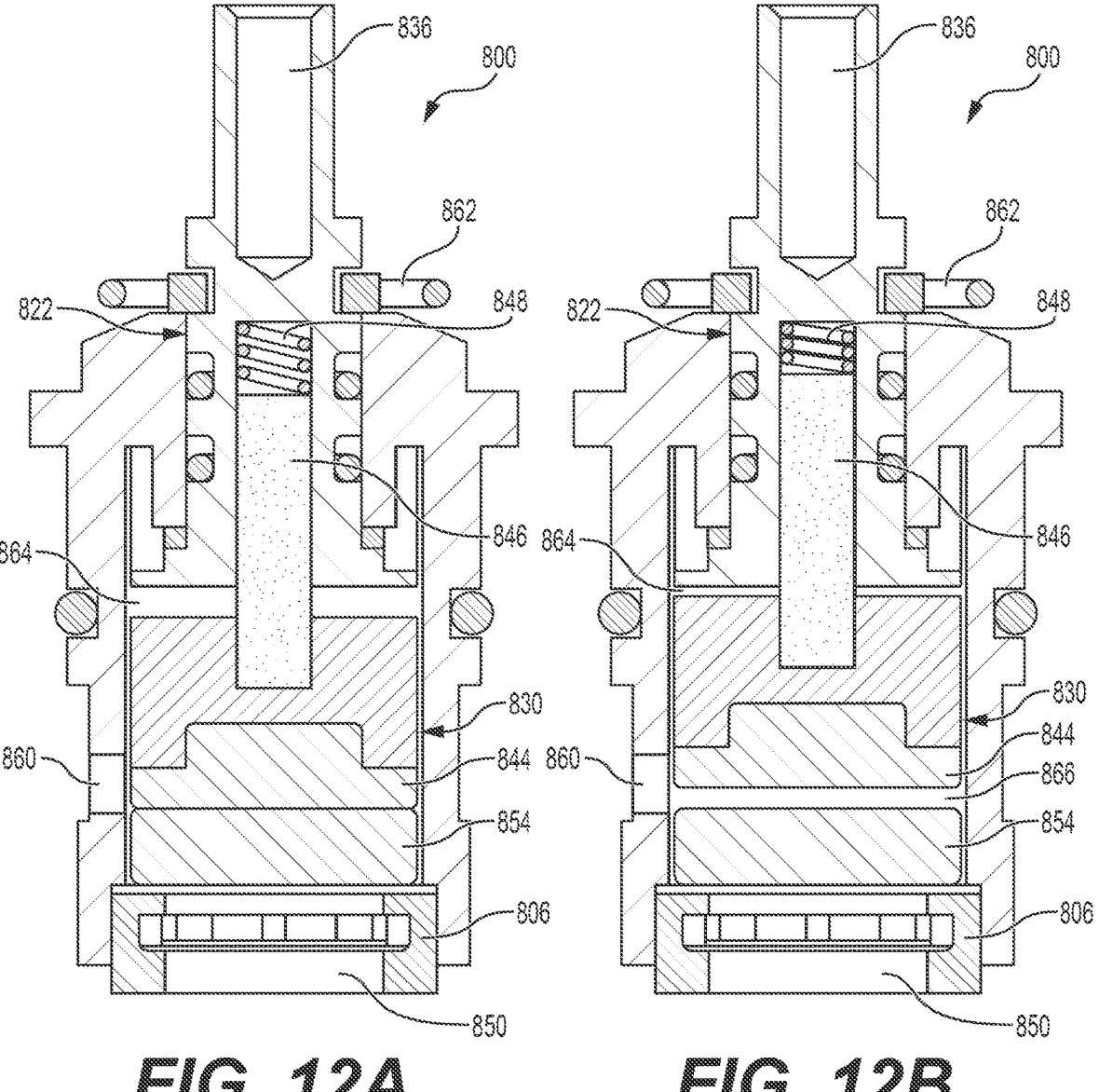
FIGS. 12A and 12B depict cross-sectional views of the cartridge embodiment shown in FIG. 11 with the split stem in different positions.

FIG. 12A shows cartridge 800 in its closed position and under normal fluid pressure conditions. Under these conditions, as FIG. 12A shows, piston 846 is in its fully extended position whereby the force of spring 848 forces piston 846 down, which in turn forces lower stem 830 down, until ceramic control disk 844 rests on ceramic cartridge base 854 and prevents fluid from flowing between ceramic cartridge base 854 and ceramic control disk 844 and out of outlet 860.

FIG. 12B shows cartridge 800 under pressurized fluid conditions. Under these conditions, as FIG. 12B shows, piston 846 is in a retracted position whereby the force of the pressurized fluid overcomes the force of spring 848, compressing it and forcing piston 846 up, which in turn forces lower stem 830 up thereby defining ceramic disk gap 866 between ceramic cartridge base 854 and ceramic control disk 844, at least a portion of ceramic disk gap 866 aligns with low-pressure outlet 860 such that an amount of fluid flows out outlet 860 when the spindle 836 has positioned ceramic control disk 844 so that its opening does not align with opening 860 and under normal conditions fluid would not flow through the valve.

Cartridge 800 can be used in single-spindle ceramic control valve faucets. Cartridge 800 is used by inserting its valve end 802 into a control valve of faucet housing, such as a faucet like that shown in FIGS. 17, 26 and 28 of U.S. Pat. No. 10,260,642. Cartridge 800 may be held in faucet housing by any means and need not have exterior O-ring 814 holding the cartridge 800 in faucet housing but could have threads or be held therein by other conventional means.

Figure 13:
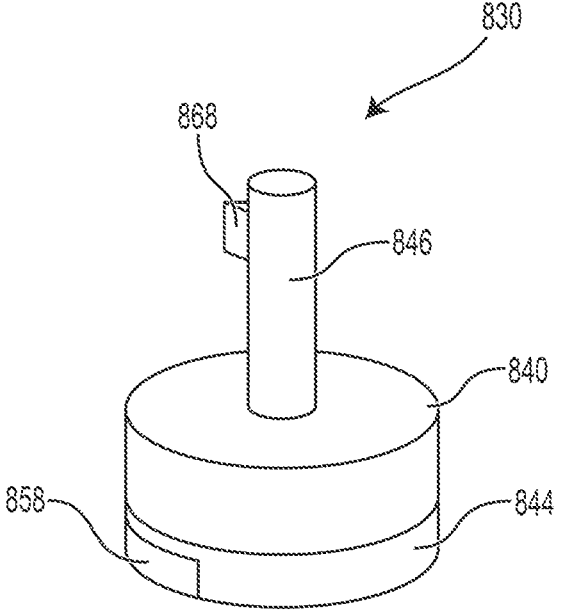
FIG. 13 is a perspective view of the lower stem of the cartridge embodiment shown in FIGS. 11, 12A and 12B.

FIG. 13 is a perspective view of lower stem 830 of cartridge 800 according to the disclosure. Piston 846 is fixed to lower stem upper end 840 and configured to rotate with upper stem 822 when spindle 836 is rotated to open or close the valve yet slide longitudinally relative to upper stem 822 so that it may be inserted into upper stem 822 and extend and retract under the force of spring 848 and pressurized fluid. Specifically, as shown in FIG. 13, piston 846 has an elongate protrusion or key on the exterior of piston 868 extending radially outward toward and longitudinally down at least a portion of the length of piston 846. Upper stem cavity 838 has a complementary recess in it that is configured to longitudinally, slidably receive the piston key 868 and hold it so that lower stem 830 rotates when upper stem 822 is rotated when spindle 836 is turned to open and close the valve by rotating ceramic control disk 844 to align or misalign its opening 858 with opening 860 and allow or prevent fluid from flowing from inlet 850 through cartridge base 806, ceramic cartridge base 854, opening 858 of ceramic control disk 844 to outlet 860.

Piston 752 and 846 need not be solid cylinders and upper stems 722 and 822 need not have cylindrical cavities 742 and 838. Rather, pistons 752 and 846 could be tubular in shape and stems 722 and 822 could have solid cores which slide into tubularly shaped pistons and have cylindrical slots in stems 722 and 822 shaped to receive them. Alternatively, pistons 752 and 846 could be rectangular in shape with complementarily shaped cavities 724 and 838. Further, multiple pistons and springs could be used with complementary cavities. Even further, upper stems 722 and 822 could have pistons with lower stems 728 and 830 having complementary cavities. Additionally, multiple pistons and cavities could be used, if desired, for greater alignment and control.

Pipe-Burst-Prevention Washerless Cartridge

Figure 14:
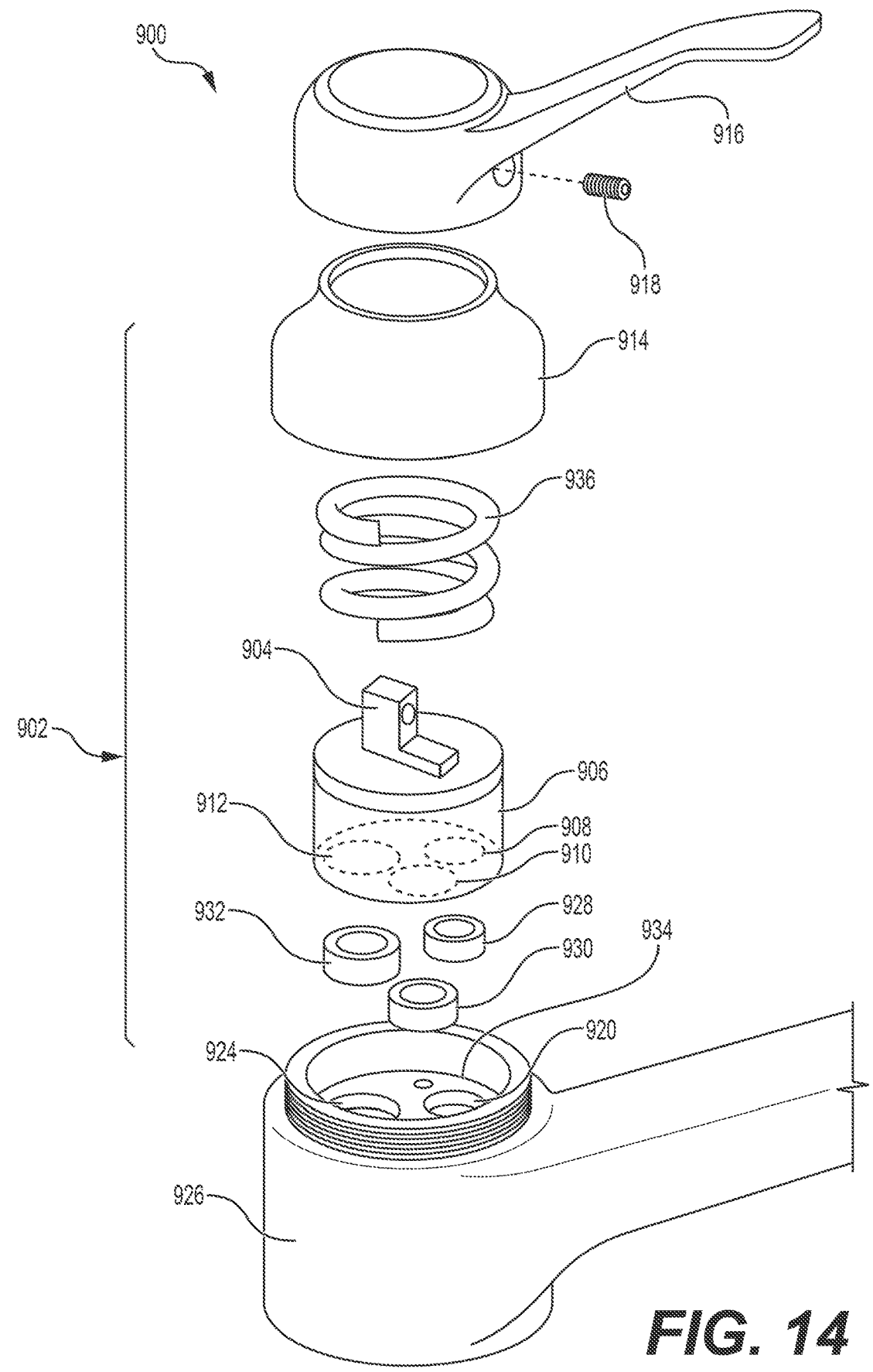
FIG. 14 is an exploded perspective view of another embodiment of a valve system according to the disclosure.

FIG. 14 depicts another embodiment of a valve system according to the disclosure. A single-handle washerless valve system 900 is shown having a cartridge 902 having a control stem 904 operably connected to a cartridge body 906 having hot and cold high pressure fluid supply openings 908 and 910 and a low-pressure fluid delivery opening 912 and over which a cap 914 and handle 916 are disposed, the handle 916 being held in place by a set screw 918 which is screwed into a hole in control stem 904. Other means could be used to attach handle 916. The cartridge openings 908, 910 and 912 correspond to openings 920, 922 (not shown) and 924 in faucet 926, and seals 928, 930 and 932, respectively. Cartridge body 906 is disposed in recess 934 within faucet 926 with openings 908, 910, and 912 aligned with openings 920, 922 (not shown), and 924, with seals 928, 930, and 932, respectively, held therebetween. Calibrated spring 936 is disposed on cartridge body 906 and held in place by cap 914 screwed into hole in stem 904. Thus, set screw 918 screwed into handle 916 and control stem 904 with cap 914 on spring 936 which in turn is disposed on cartridge 906 with washers 932, 928 and 930 therebetween in recess 934 on faucet 926 aligned as described not only holds handle 916 in place but also cap 914 with spring 936 on cartridge 906 and washers 932, 928 and 930 therebetween in recess 934 on faucet 926.

Handle 916 is rotated right or left to adjust the temperature of the fluid flowing out of faucet 926 which aligns or misaligns openings 908 and 910 with 920 and 922 to allow more or less of hot or cold fluid to flow, thereby controlling the amount that hot 920 or cold 922 fluid supplied and the temperature of the fluid flowing out of outlet 924. Handle 916 is lifted or lowered to control the amount of fluid flowing out of valve system 900 causing it to raise cartridge body 906 up proportionately to the distance handle 916 is raised off of seals 928, 930 and 932, and allowing water to flow through high-pressure faucet openings 920, 922 and out delivery opening 924.

Cartridge 902 is configured and the lengths of control stem 904, cartridge body 906, cap 914 and spring 936 are sized to allow cartridge body 906 to raise off faucet 926 when the pressure of the fluid in the faucet 926 is greater than the predetermined pressure of the spring 936 so that spring 936 is compressed and an amount of fluid flows through openings 908, 910, 912, 920, 922 and 924. Spring 936 applies a force on cartridge body 906 and in turn seals 928, 930 and 932 on openings 920, 922 and 924 to keep valve 900 closed under normal fluid pressure conditions. When the fluid pressure rises above a predetermined pressure which is the compressive force required to compress spring 936, the fluid pressure forces cartridge body 906 upward allowing fluid to flow from high-pressure faucet inlet openings 920 and 922 to low-pressure outlet opening 924.

Preferably, cartridge 902 is configured and the lengths of control stem 904, cartridge body 906, cap 914 and spring 936 are sized to allow cartridge body 906 to raise off faucet openings 920, 922 and 924 when the pressure of the fluid is greater than the predetermined pressure of the spring 936 to allow at an amount of fluid to flow from faucet inlets 920 and 922 to faucet outlet 924 that is less than the amount of fluid that would flow through outlet 924 when handle 916 is in its fully open position. More preferably, cartridge 902 is configured and the lengths of control stem 904, cartridge 906, cap 914 and spring 936 are sized to allow cartridge 902 to raise off faucet 926 when the fluid pressure exceeds the predetermined pressure, and allow an amount of fluid to flow through the faucet 926 by an amount that is between about 50% and about 80% less than the normal flow of fluid through the valve system 900 when the valve is in its fully open position, or by a distance that allows between about 0.25 and about 1.25 GPM and about 0.10 and about 0.50 GPM to flow through the valve. Even more preferably, cartridge 902 is configured and the lengths of control stem 904, cartridge body 906, cap 914 and spring 936 are sized to allow cartridge body 906 to raise off faucet 926, when handle 916 is in its closed position and the fluid pressure in faucet 926 exceeds the predetermined pressure, by a distance that allows an amount of fluid to flow through faucet openings 920, 922 and 924 that is less than about 0.40 GPM.

Spring 936 has a compressive force that allows valve system 900 to relieve pressure in the building plumbing system at the desired predetermined pressure. Thus, spring 936 is capable of compressing when the pressure of the fluid in cartridge 902 exceeds the predetermined pressure. Spring 936 has a predetermined activation pressure as described above according to the type of pipes and components in the building plumbing system.

Relief valves 100, 200 and 300, valve system 400, 500, 600 and 900, and cartridge 700, 800, and 902 may be made of using any material used to make conventional valves, valve systems and cartridges, including metals and metal alloys (e.g., brass, nickel, titanium, or stainless streel), polymeric or hard rubber materials (e.g., polystyrene-buta-diene-styrenes ("SBS"), polyacrylonitrile-butadiene-sty-renes ("ABS")), and any material disclosed in U.S. Pat. No. 10,260,642, which is hereby incorporated by reference in its entirety, and by any method used to make conventional valves, valve systems and cartridges, including those described in the '642 patent or U.S. Pat. Nos. 7,475,703, and 3,810,602, which are also hereby incorporated by reference.

Method of Preventing Pipe Bursts in a Building Plumbing System

A method of preventing pipe bursts due to freezing comprises the steps of disposing a pressure relief valve according to the disclosure, such as relief valves 100, 200 or 300, in fluid communication with a building plumbing system. Preferably, relief valve 100, 200 or 300 is disposed between a fluid source and a control valve or other fixture in the pipe for delivery water to an end user. More preferably, the method comprises disposing relief valve 100, 200 or 300 behind the same wall in which a control valve or other fixture in the building plumbing system is disposed.

A further method for preventing pipe bursts due to freezing can comprise disposing a pipe burst prevention valve system in a building plumbing system comprising a faucet housing having handle and outlet, control valve having inlet, and bypass having a relief valve according to the disclosure, such as relief valve 100, 200 or 300, disposed in fluid communication between one inlet and one outlet. Another method for preventing pipe bursts due to freezing can comprise disposing a pipe burst prevention valve system in a building plumbing system comprising a faucet housing having a handle and an outlet, a control valve having two inlets and a mixing valve cartridge, and a bypass having a relief valve according to the disclosure, such as relief valve 100, 200 or 300, disposed in fluid communication between one inlet and the outlet.

A method of preventing pipe bursts due to freezing in a building plumbing system further comprises the steps of disposing a fluid control valve system according to the disclosure in a building plumbing system. Fluid control valve system can be faucet valve system shown in FIGS. 17, 26 and 28 of U.S. Pat. No. 10,260,642, or FIG. 4, 6, or 8 herein with cartridge 700 and 800, or FIG. 14 with valve system 900 and cartridge 902. More specifically, a method for preventing pipe bursts due to freezing can comprise disposing a pipe burst prevention valve system in a building plumbing system that has a faucet housing having handle and outlet, control valve 406A, 406B, 502A, 502B, or 900 according to the disclosure having an inlet, and a cartridge 700, 800 or 902 according to the disclosure disposed in fluid communication between one inlet and one outlet.

"Fluid" and "water" as used herein are understood to be any liquid that can freeze. For a domestic plumbing system, the fluid typically is 100% pure water with associated minerals and salt and other additives or naturally occurring substances. However, fluid or water as used herein could be any liquid that has the potential to freeze in a building plumbing system when the system reaches the temperature at which the fluid freezes, such as any aqueous liquid having a sufficient amount of water in it to freeze under the building conditions.

It must be understood that despite the use of the singular "a" or "an" in a claim they cover more than one claimed element. For example, a claim to the relief valve according to the disclosure covers use of more than one relief valve according to the disclosure or a relief valve according to the disclosure and a cartridge or other fixture in a building plumbing system. Similarly, by way of another example, a claim to a cartridge according to the disclosure covers use of more than one cartridge according to the disclosure and a cartridge and a relief valve according to the disclosure.

It also will be understood that the claims are not limited to the embodiments described herein. The features of the pressure relief valve, cartridge, control valve system, and methods described are exemplary and may be altered, omit-ted, or adapted according to the requirements of the plumb-ing system function and features desired. It will also be understood that the embodiments described include the description herein as well as combinations and sub-combi-nations of any of the features and equivalents thereof, and any such combinations set forth in the original claims or any amendments thereto.

What is claimed is:

1. A relief valve for pipes or valves or other fixtures in a building plumbing system, comprising:
   a body having an inlet, an outlet, an exterior surface, and an interior surface that defines a generally longitudinal passageway that extends from the inlet to the outlet and is capable of allowing fluid to flow from inlet to outlet;
   a valve seat disposed on the interior surface of said body between the inlet and the outlet;
   a flow limiter disposed on the interior surface of said body between said valve seat and the outlet, and extending into the passageway; and
   a valve seat sealing portion disposed in fluid communi-cation with said valve seat between the inlet and said flow limiter, and configured to seal said valve seat against the flow of fluid in the passageway when the fluid has a pressure that is less than a predetermined pressure.

2. The relief valve according to claim 1, wherein the predetermined pressure is less than about 1000 pounds per square inch.

3. The relief valve according to claim 2, wherein the predetermined pressure is less than about 500 pounds per square inch.

4. The relief valve according to claim 3, wherein the predetermined pressure is between about 200 and about 395 pounds per square inch.

5. The relief valve according to claim 1, wherein said flow limiter is configured to limit the flow of fluid through it to less than about 0.4 gallons per minute at a fluid pressure.

6. The relief valve according to claim 5, wherein said flow limiter is configured to limit the flow of fluid through it to from about 0.25 gallons per minute to about 1.25 gallons per minute.

7. The relief valve according to claim 5, wherein said flow limiter is comprised of a plurality of orifices.

8. The relief valve according to claim 1, wherein the valve seat is disposed generally parallel to the exterior surface of said body.

9. The relief valve according to claim 1, wherein the valve seat is disposed generally transverse to the exterior surface of said body.

10. The relief valve according to claim 1, wherein the valve seat sealing portion comprises a burst disk.

11. The relief valve according to claim 10, wherein the burst disk has a score.

12. A compact, pipe-burst-prevention valve system for use in a building plumbing system, comprising:

a faucet housing having a handle and an outlet for delivering fluid to an end user;

a control valve having an inlet and an outlet in fluid communication with each other and the control valve outlet in fluid communication with the faucet outlet; and a relief valve, comprising:

a body having an inlet in fluid communication with the control valve inlet, an outlet in fluid communication with the control valve outlet, an exterior surface, and an interior surface that defines a generally longitudinal passageway that extends from the relief valve body inlet to the relief valve body outlet;

a valve seat disposed on the interior surface of said body between the relief valve body inlet and outlet;

a flow limiter disposed on the interior surface of said body between said valve seat and the relief valve body outlet and extending into the passageway; and a valve seat sealing portion disposed in fluid communication with said valve seat between the relief valve body inlet and said flow limiter, and configured to seal said valve seat against the flow of fluid when the fluid has a pressure that is less than a predetermined pressure.

13. The valve system according to claim 12, wherein said a control valve has a housing and said relief valve is disposed in the control valve housing.

14. The valve system according to claim 12, wherein the relief valve flow limiter is comprised of a plurality of orifices.

15. The valve system according to claim 12, wherein the valve seat is disposed generally parallel to the exterior surface of said relief valve body.

16. The relief valve according to claim 12, wherein the valve seat is disposed generally transverse to the exterior surface of said relief valve body.

17. The valve system according to claim 12, further comprising:

a second control valve having an inlet and an outlet in fluid communication with each other and the second control valve outlet in fluid communication with the faucet outlet.

18. A method of preventing pipes from bursting, comprising the steps of:

disposing a pressure relief valve in fluid communication with a building plumbing system, the pressure relief valve, comprising:

a body having an inlet, an outlet, an exterior surface, and an interior surface that defines a generally longitudinal passageway that extends from the inlet to the outlet and is capable of allowing fluid to flow from inlet to outlet;

a valve seat disposed on the interior surface of said body between the inlet and the outlet;

a flow limiter disposed on the interior surface of said body between said valve seat and the outlet, and extending into the passageway; and a valve seat sealing portion disposed in fluid communication with said valve seat between the inlet and said flow limiter, and configured to seal said valve seat against the flow of fluid in the passageway when the fluid has a pressure that is less than a predetermined pressure.

19. The method according to claim 18, wherein the pressure relief valve is disposed in fluid communication with the building plumbing system between a fluid source and a fixture for delivering water to an end user.

20. The method according to claim 18, wherein the relief valve flow limiter is comprised of a plurality of orifices.

* * * * *